(12) United States Patent
Smyth

(10) Patent No.: US 9,842,511 B2
(45) Date of Patent: Dec. 12, 2017

(54) METHOD AND APPARATUS FOR FACILITATING ATTENTION TO A TASK

(71) Applicant: U.S. Army Research Laboratory ATTN: RDRL-LOC-I, Washington, DC (US)

(72) Inventor: Christopher C. Smyth, Fallston, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/721,161

(22) Filed: Dec. 20, 2012

(65) Prior Publication Data
US 2014/0178843 A1    Jun. 26, 2014

(51) Int. Cl.
G09B 19/00    (2006.01)

(52) U.S. Cl.
CPC .................... *G09B 19/00* (2013.01)

(58) Field of Classification Search
CPC .......... G06Q 10/06; G05B 2219/36133; G01C 23/00; G06T 15/005; G09B 19/00
USPC ................. 705/7.12, 7.13, 7.42; 434/238
See application file for complete search history.

(56) References Cited

U.S. PATENT DOCUMENTS

| | | | |
|---|---|---|---|
| 4,970,683 A * | 11/1990 | Harshaw et al. | 715/841 |
| 5,649,061 A | 7/1997 | Smyth | |
| 5,689,619 A | 11/1997 | Smyth | |
| 6,232,974 B1 * | 5/2001 | Horvitz | G06F 9/50 345/419 |
| 6,400,996 B1 * | 6/2002 | Hoffberg | G05B 19/0426 370/218 |
| 6,707,476 B1 * | 3/2004 | Hochstedler | G06F 9/4443 715/744 |
| 7,764,247 B2 * | 7/2010 | Blanco | G01C 21/365 345/7 |
| 8,564,533 B2 * | 10/2013 | Yuan | 345/156 |
| 8,719,724 B2 * | 5/2014 | Kawalkar | G06F 3/04886 715/773 |
| 9,128,594 B1 * | 9/2015 | Hufnagel | G06F 3/04845 |
| 9,198,575 B1 * | 12/2015 | Blacutt | G06K 9/00845 |

(Continued)

FOREIGN PATENT DOCUMENTS

SE    WO 2012045371 A1 *  4/2012   .......... G05B 19/042

OTHER PUBLICATIONS

Beckman, O. E. (1998). Analyzing the effects of display characteristics and cognitive variables on performance using keystroke and eye movement data. (Order No. 9921766, Old Dominion University). ProQuest Dissertations and Theses, , 81-81 p.*

(Continued)

*Primary Examiner* — Peter Choi
*Assistant Examiner* — Alissa Karmis
(74) *Attorney, Agent, or Firm* — Eric Brett Compton

(57) ABSTRACT

A method and apparatus for facilitating attention to a task are disclosed. The method may include: detecting, with a sensor, one or more movements, estimating the task attention state based on the one or more movements, determining the workload based on the estimated attention state, and determining based on the workload, the optimal format for the relay of operational information that best facilitates attention to the task for increased ease of task performance.

27 Claims, 19 Drawing Sheets

(56) References Cited

U.S. PATENT DOCUMENTS

| | | | |
|---|---|---|---|
| 2003/0046401 A1* | 3/2003 | Abbott et al. | 709/228 |
| 2003/0167454 A1* | 9/2003 | Iordanov et al. | 717/104 |
| 2004/0098462 A1* | 5/2004 | Horvitz et al. | 709/207 |
| 2004/0183749 A1* | 9/2004 | Vertegaal | 345/7 |
| 2006/0190822 A1* | 8/2006 | Basson | G06Q 10/10 715/700 |
| 2007/0165019 A1* | 7/2007 | Hale | G06Q 10/00 345/418 |
| 2007/0185697 A1* | 8/2007 | Tan et al. | 703/11 |
| 2007/0279591 A1* | 12/2007 | Wezowski et al. | 351/208 |
| 2008/0094589 A1* | 4/2008 | Panitz | G03B 21/00 353/122 |
| 2009/0024260 A1* | 1/2009 | Deleris | G01D 7/002 701/14 |
| 2009/0055739 A1* | 2/2009 | Murillo et al. | 715/708 |
| 2009/0077493 A1* | 3/2009 | Hempel | G06F 3/038 715/810 |
| 2009/0086021 A1* | 4/2009 | Baier et al. | 348/143 |
| 2010/0153313 A1* | 6/2010 | Baldwin | G06F 1/1626 706/11 |
| 2010/0231705 A1* | 9/2010 | Yahav et al. | 348/115 |
| 2011/0074573 A1* | 3/2011 | Seshadri | G06F 3/038 340/539.13 |
| 2011/0270123 A1* | 11/2011 | Reiner | A61B 6/463 600/558 |
| 2011/0273369 A1* | 11/2011 | Imai et al. | 345/158 |
| 2011/0309924 A1* | 12/2011 | Dybalski et al. | 340/438 |
| 2012/0075123 A1* | 3/2012 | Keinrath et al. | 340/963 |
| 2012/0146891 A1* | 6/2012 | Kalinli | H04N 19/33 345/156 |
| 2013/0033433 A1* | 2/2013 | Rogers | G06F 3/04886 345/173 |
| 2013/0038437 A1* | 2/2013 | Talati et al. | 340/438 |
| 2013/0097557 A1* | 4/2013 | Madau et al. | 715/810 |
| 2013/0152001 A1* | 6/2013 | Lovitt et al. | 715/765 |
| 2013/0158963 A1* | 6/2013 | Brooks et al. | 703/2 |
| 2014/0092006 A1* | 4/2014 | Boelter et al. | 345/156 |

OTHER PUBLICATIONS

Mitchell, C. M. (1980). The Design of Computer Based Integrated Information Displays. (Order No. 8107368, The Ohio State University). ProQuest Dissertations and Theses, , 291-291 p.*

Ehrhart, L. S. (1994). Cognitive systems engineering: Human-computer interaction design for decision support. (Order No. 9509612, George Mason University). ProQuest Dissertations and Theses, , 507-507 p.*

Miller, et al., "User Acceptance of an Intelligent User Interface: A Rotocraft Pilot's Associate Example", published in IUI '99 Proceedings of the 4th International Conference on Intelligent User Interfaces, pp. 109-116.*

Francis, Gregory. "A Software Tool for the Design of Multifunction Displays", Sep. 1999. U.S. Army Aeromedical Research Laboratory (USAARL) Report No. 99-20.*

Jacob et al., Eye Tracking in Human-Computer Interaction and Usability Research: Ready to Deliver the Promises. The Mind's Eye: Cognitive and Applied Aspects of Eye Movement Research. Hyona, Radach and Deubel (eds.) Oxford, England. Copyright 2003 by Elsevier Science BV.*

Jenkins, Joseph C. The Effect of Configural Displays on Pilot Situation Awareness in Helmet-Mounted Displays. Dissertation Abstracts International. vol. 68, No. 07, suppl. B, 253 p. 2007.*

Russell, Christopher A. Operator State Estimation for Adaptive Aiding in Uninhabited Combat Air Vehicles, Air Force Institute of Technology, Ann Arbor, 2005, ProQuest Dissertations & Theses Global.*

Strickland, Ted J., Jr. Dynamic Management of Multichannel Interfaces for Human Interaction with Computer-Based Intelligent Assistants, The University of Arizona, Ann Arbor, 1989, ProQuest Dissertations & Theses Global.*

Borah, J. (1998). "The Technology and Application of Gaze Based Control." Alternative Control Technologies: Human Factors Issues, RTO-EN-3, Research and Technology Organization, North Atlantic Treaty Organization. Quebec, Canada: Canada Communications Group, Inc.

Card, S.K., Morgan, T.P., & Newell, A. (1980). The keystroke-level model for user performance time with interactive systems. Graphics and Image Processing, Communications of the ACM, 23[7], 396-410.

Card, S.K., Morgan, T.P., & Newell, A. (1983). The psychology of human-computer interaction. Hillsdale, NJ: Erlbaum.

Carpenter, P. A. & M. A. Just (1978). "Eye fixations during mental rotations." In W. Senders, D. F. Fisher, & R. A. Monty (Eds.) Eye Movements and the Higher Psychological Functions (115-133), Hillsdale, New Jersey: Lawrence Erlbaum Associates.

Department of Defense (1999). Design Criteria Standard: Human Engineering, MIL-STD-1472F, Aug. 23, 1999, Washington, DC: U.S. Government Printing Office.

Jacob, R. J. K. (1991). "The use of eye movements in human-computer interaction techniques: What you see is what you get". ACM Transactions on Information Systems 9, 1991, 152-169.

Lopez, M. del C. (1989). Software and Hardware Description of the Helicopter Motion Equations for VAX Computers (Technical Memorandum 8-89). Aberdeen Proving Ground, MD: U.S. Army Human Engineering Laboratory.

Rasmussen, J. (1993). "Deciding and doing: Decision making in natural contexts." In: G. Klein, J. Orasanu, R. Calderwood, and C. E. Zsambok (eds.), Decision making in action: Models and methods. Norwood, NJ: Ablex, pp. 158-171.

Rood, G. M. (1998). "Operational Rationale and Related Issues for Alternative Control Technologies." Alternative Control Technologies: Human Factors Issues, RTO-EN-3, Research and Technology Organization, North Atlantic Treaty Organization. Quebec, Canada: Canada Communications Group, Inc.

Smyth, C. C., and M. E. Dominessy (1989). Comparison of Oculometer and Head-Fixed Reticle with Voice or Switch and Touch Panel for Data Entry on a Generic Tactical Air Combat Display (Technical Memorandum 21-89). Aberdeen Proving Ground, MD: U.S. Army Human Engineering Laboratory.

P. Sauseng, W. Klimesch, R. Freunberger, T. Pecherstorfer, S. Hanslmayr and M. Doppelmayr, "Relevance of EEG alpha and theta oscillations during task switching", Department of Psychology, University of Salzburg, Nov. 30, 2005, pp. 295-301.

* cited by examiner

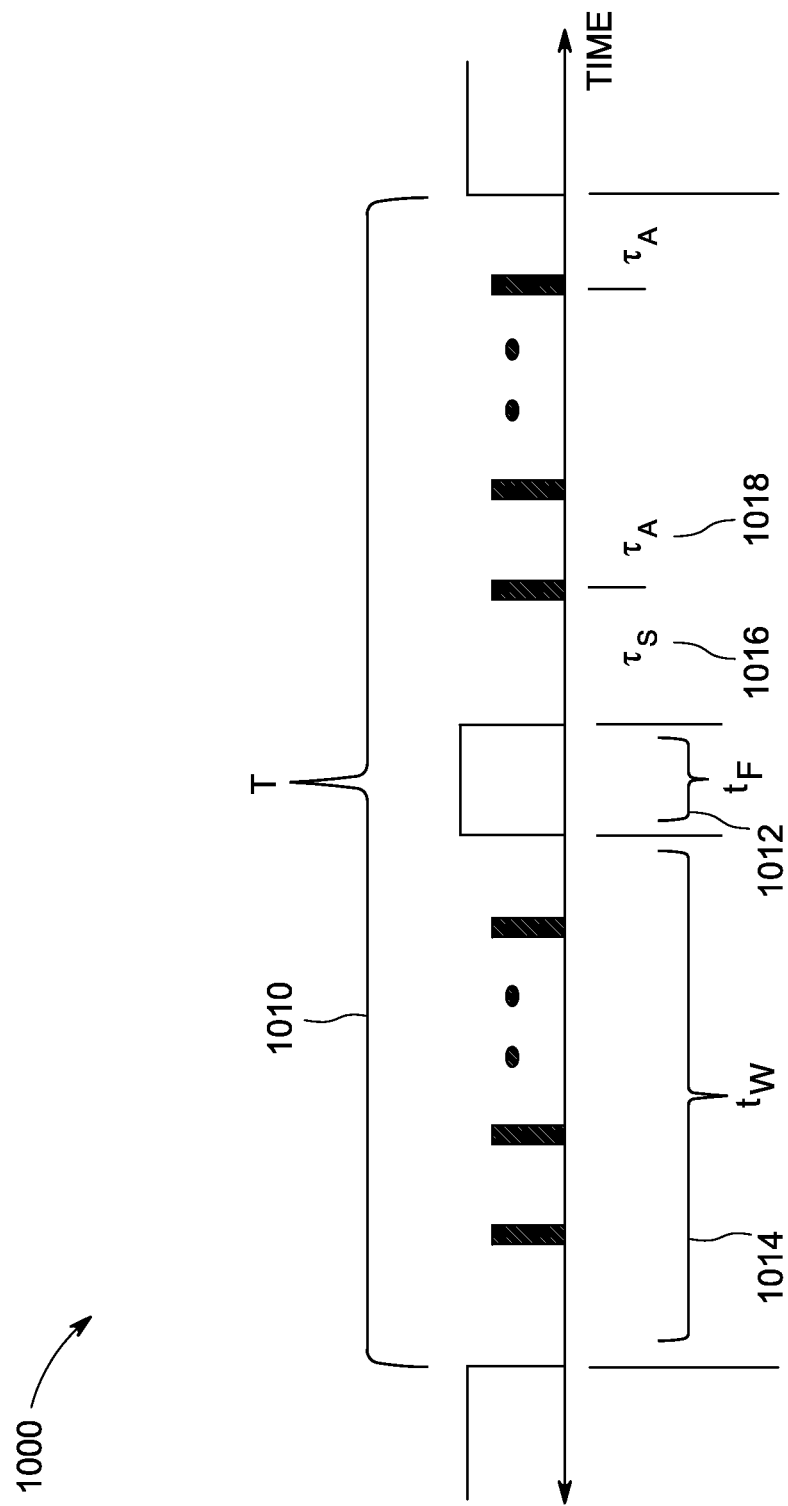

METHOD AND APPARATUS FOR FACILITATING ATTENTION TO A TASK

GOVERNMENT INTEREST

Governmental Interest—The invention described herein may be manufactured, used and licensed by or for the U.S. Government.

FIELD OF INVENTION

Embodiments of the present invention generally relate to vehicle navigation and, more particularly, to a method and apparatus for facilitating attention of a vehicle operator to a control task.

BACKGROUND OF THE INVENTION

The effectiveness of alternative control technologies is of interest to designers of vehicles because of the potential for conflicts among the multiple tasks needed to manage the systems. Typically, operators of a vehicle, machine, or the like perform operations relating to the vehicle using their hands. The operators also use their other senses such as vision, hearing and touch, to enhance their operational abilities. In some instances, operators tend to be overwhelmed when too many senses are engaged simultaneously, and the operator unsuccessfully attempts to perform a particular operation. This is especially true for the control stations of unmanned air and ground vehicles due to the multiple tasks required to manage the system and operate multifunctional displays. Although many of these tasks are automated with an electronic associate in the form of embedded computer programs, there are times when the automation will defer to the human operator for evaluation and decision. In these cases the human operator has to both navigate the vehicle and operate the displays thereby placing a high load on the cognitive and manual functions.

Using alternative control technologies such as eye-pointing for vision-directed control of machines and vehicles has proven to be a viable alternative technology for display control in dedicated tasks. However, the effect of eye-pointing upon the performance of dual-tasks requiring shared attention to separate visual scenes, such as concurrent display operations and vehicle control, has not been extensively researched. Because of the multiple tasks needed to manage the system and operate the multifunctional displays, eye-pointing technology may serve as an alternative display control device during periods of high operator workload. However, even with eye-pointing technology, the current art inherently limits the display resolution size because of the need to use foveal vision for visual acuity and because of small, involuntary saccade-like eye jitters during fixation of eye gaze. The need for forced visual fixation causes visual tunneling reducing peripheral vision, potentially hazardous to operation and navigation. Finally, an operator's natural gaze may fall upon several controls successively resulting in difficulty in determining a control of interest.

Further control difficulties are incurred with the vision-directed control task as a dual-task shared with concurrent multiple tasks, because of the need to perform one task while monitoring the status of the other. Along with the additional visual attention load of switching attention between tasks, there is the cognitive loading of scheduling task activity along with the task recall and evaluation involved in monitoring, as well as the task focus and decision involved in further task execution.

Therefore, there is a need in the art for a method and apparatus for formatting task information in arrangements that best facilitate attention to the task for increased ease of task performance.

BRIEF SUMMARY OF THE INVENTION

Embodiments of the present invention relate to method for micro-modeling visual attention comprising detecting movement of an operator of an apparatus, estimating the operator's cognitive state and consequent workload based on the movement and attributes and determining, based on the estimated workload, a quantity of information to relay to the operator and the optimal format for relay of the information to best facilitate operator performance.

Another embodiment of the present invention is directed to an apparatus for micro-modeling visual attention comprising a movement tracker module for detecting movement of an operator of an apparatus, a workload estimator module for estimating the operator's cognitive state and consequent workload based on the movement and attributes and an adaptive aider for determining, based on the estimated workload, a quantity of information to relay to the operator and the optimal format for relay of the information to best facilitate operator performance.

In one form of embodiment, the invention may constitute an alert to facilitate situational awareness when the workload exceeds a threshold, while in another, the embodiment may facilitate attention by formatting task information so as to reduce cognitive loading from multi-tasking and thereby increase the ease of performance of action in response to an alert. In a further embodiment, the invention is an electronic 'secretary', which electronically aware of the task priorities, schedules the information needs for the task and arranges such in display formats that are in a manner supportive of the cognitive flow needed for performance by the operator.

In a still further embodiment, the invention incorporates a micro-model of human cognitive information processing as pertains to tasks for vehicle control operations; in particular, the application of a Skills-Rules-Knowledge (SRK) micro-model of workload as a framework to track the attention state of the operator's task performance using eye tracking as an index. In this embodiment, cognitive processing is modeled at the hierarchal levels of task-switching, rule-reasoning, and skill-processing, with each of these cognitive levels involving different cognitive loading and corresponding workload based on activity at the 100 millisecond duration of cognitive processing. In this embodiment, the invention maps the cognitive levels of the SRK model to the stages of task involvement to determine an optimal information format to best facilitate task performance.

The invention has applications to adaptive automated electronic aiding designs for aiding vehicle control operations by predicting the cognitive state of the operator based on his/her eye movements relative to the task elements. The invention affords real-time refinement of the aiding process so as support the operator's cognitive state and reduce potential cognitive confounding through adjustment of the timing and salience of the aids to fit the task. As a result of an on-going cost/benefit analysis of the effect on system performance, the electronic aider may adjust the control strategy to facilitate eye-pointing as an alternative control technology in vision-directed control tasks.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 10 is an illustration of the dual-task control strategy time line in accordance with exemplary embodiments of the present invention;

DETAILED DESCRIPTION OF THE INVENTION

Embodiments of the present invention comprise a method and apparatus for micro-modeling the visual attention of an operator of a machine such as a vehicle. In an exemplary embodiment, an operator's movement and physical or mental attributes are detected while using a particular machine. An estimate is made of the operator's current workload based on the movement and attributes, as well as the engagement of various machine controls. Information is then relayed to the user, where the quantity of information and corresponding display format are adjusted according to the current workload of the operator. The SRK micro-model described in the disclosure models the subjective workload caused by cognitive loading such as that of task switching, rule application, and skills. Each of these cognitive levels involves different cognitive loading and corresponding workload. The micro-model is based on activity described at the 100-200 ms duration of cognitive processing, and more particularly at the 200 ms level for most human beings. The model maps the cognitive levels to the stage of task involvement of the operator.

According to one embodiment, the micro-model is used to guide the formatting of information for facilitating task performance. In this way, this embodiment forms an electronic 'helper' formatting the task information so as to facilitate cognitive processing and decision, similar to an electronic 'secretary', which is aware of task priorities, schedules information needs for the task and arranges the information in a format that is in a manner supportive of the cognitive flow needed for performance by the operator.

Figure 1:
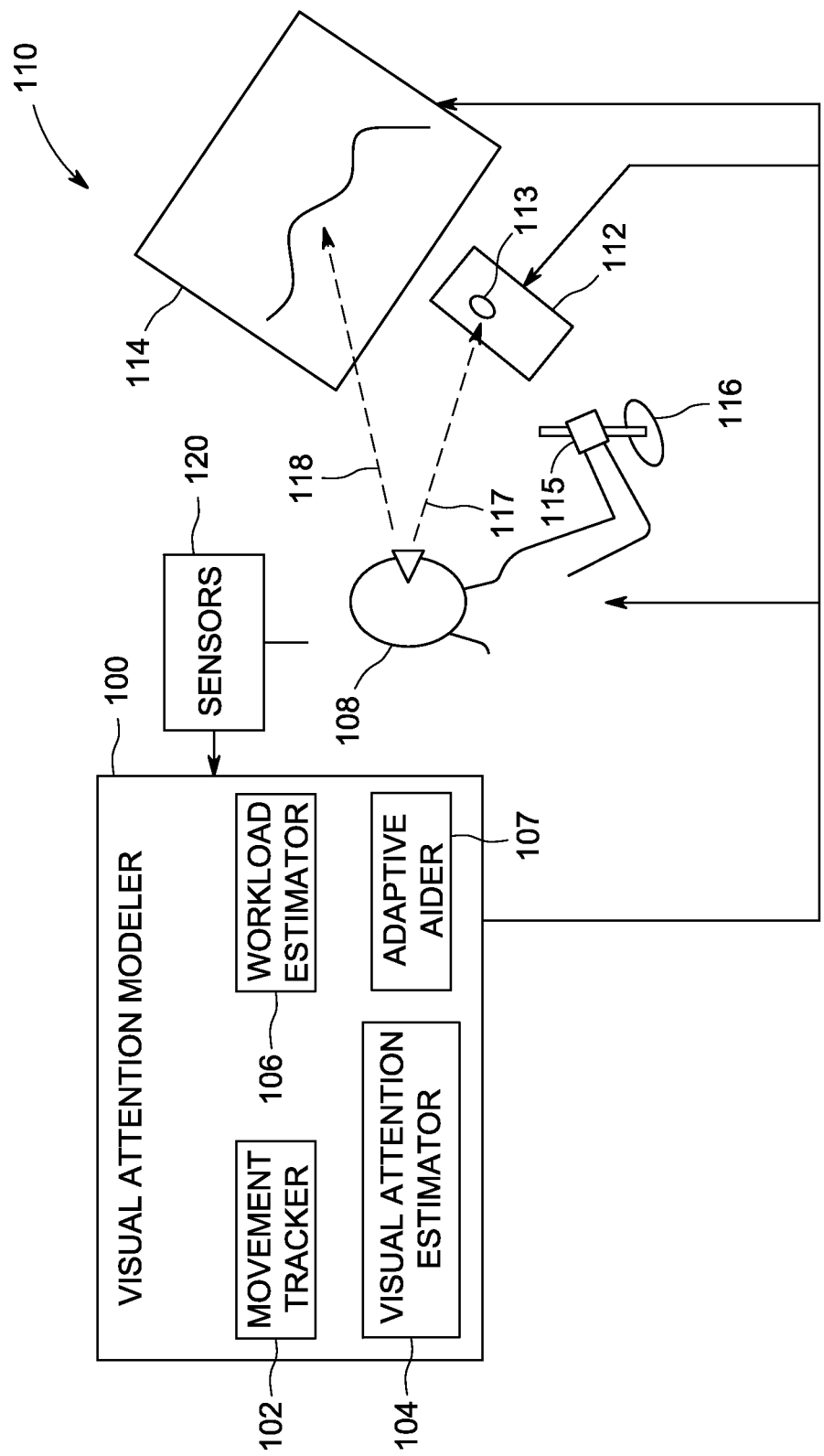
FIG. 1 is a block diagram of an apparatus for micro-modeling the visual attention in accordance with exemplary embodiments of the present invention.

FIG. 1 is a block diagram of a visual attention modeler 100 for micro-modeling the visual attention in accordance with exemplary embodiments of the present invention. The visual attention modeler 100 comprises a movement tracker 102, a visual attention estimator 104, a workload estimator 106, and an adaptive aider 107. An operator 108 controls a machine 110 through the use of visual attention 118 to an external scene display 114. The operator 108 may also operate a panel display 112 with a display menu 113 using eye-gaze 117 of the operator 108 for activation of a separate control action or by touch in an alternative technology. The operator may use his or her hand 115 to operate a vehicle controller 116.

The operator 108 is coupled to the visual attention modeler 100 through a plurality of sensors 120. The visual attention modeler 100 forms a computer model of the mental processes held by the operator of the vehicle to aid in navigation. The model is structured in computer memory, as the state of mental processes, in particular that of visual attention, formed from a set of movements and attributes from the sensors 120, a set of current tasks being performed by the operator, a set of tasks which are required to be performed by the operator, the attention of the operator on his current and future tasks, and the like. The sensors 120 may comprise, according to exemplary embodiments, eye tracking sensors, bodily movement trackers, heart monitors, physiological recorders, in particular, encephalograms. The sensors 120 transmit physical movement of the operator 108 and attributes of mental processes to the visual attention modeler 100. The visual attention modeler 100 models the operator's visual attention based on the various readings from the sensors 120. In addition, the sensors 120 also capture the operator's use of the panel display 112, the various controls the operators may have activated and the like.

The readings from the sensor 120 and the panel 112 are performed by the movement tracker 102. Once the movements have been recorded by the movement tracker 102, the movement information is coupled to the visual attention estimator 104 and workload estimator 106. The visual attention estimator 104 determines an estimation of the visual attention of the operator 108. Visual attention of an operator is dictated by the primary task of a particular system mission, i.e., navigating a vehicle along a set path, which may require obstacle avoidance as well as instrumentation interaction with the panel display 112 for course correction.

The workload estimator 106 calculates an operator's estimated workload. According to an exemplary embodiment, workload is defined as the amount of effort, both psychological and physical, that is expended in response to system demand according to an internal standard of performance of the operator, e.g., vehicle control and menu operations are self paced tasks, and the task load is established by the time to task completion and the error rate incurred in comparison to the standards established during training of a similar task.

In assessing the workload, the workload estimator 106 is initially provided with a system mission, i.e., a mission which the operator is undertaking, and the functions and tasks to be performed by the operator (or one or more operators) in that mission, in the form of a simulation model. A hierarchy of task analysis network diagrams is used to depict the functions and the tasks of the mission, to be completed by a crew of operators. The network links together the tasks in a sequence of activities with the tasks denoted by the network branches and task completion by the nodes.

Depending on the result of a task activity, branching to the next task can occur among tasks connected to the same node. This branching is dictated by a set of branching rules, which may be probabilistic, repeating, or tactical in form. Associated with each task are the specifications for the mean and standard deviation statistics of the performance time, the accuracy of the result, and the effects on the branching rules. In other embodiments, the task may be subdivided into micro-state activities with associated component times. This is also true of Goal Orientation, another version of workload estimation in which criteria for goal oriented behavior may be implemented.

Associated with each task are attention-loading values for activation of the human visual, auditory, cognitive, and psychomotor information processing channels during task performance and the additional loading attributable to channel conflicts. The attention loading values may be combined into an overall workload measure. Workload management strategies may be designated to handle work overload. The machine displays and controls with which the crew member interfaces are assigned channels as resources that are activated for operations. In turn, the interfaces are assigned to the tasks. Finally, individual crew members are assigned tasks.

When the simulation model is executed, the tasks are scheduled and performed as specified in the flow diagrams and branching logic. As the tasks are performed, the total instantaneous workload prediction is calculated as the weighted sum of the load on each of the channels at a moment in time as rated with the loading values and a factor that accounts for the amount of conflict between and within resources that are used in parallel. The predicted workload output is a measure of the amount of effort that the tasks, the scenario, and the interfaces are imposing on the operator 108.

The adaptive aider 107 determines an appropriate quantity of information and associated display format to relay to the operator 108, considering the operator's estimated visual attention and workload. For example, if it is determined that the operator 108 is overloaded with physical tasks such as changing the current navigational path using the display 112 in addition to mental tasks such as reviewing terrain exterior to the vehicle being operated, the adaptive aider relays an appropriate quantity of information to the operator 108 in a format facilitating task performance. In one embodiment, if the visual attention of the operator 108 is determined to be lower than a particular threshold value, the adaptive aider gives a corresponding amount of information regarding, for example, the user's surroundings, nearby obstacles, and the like.

Figure 2:
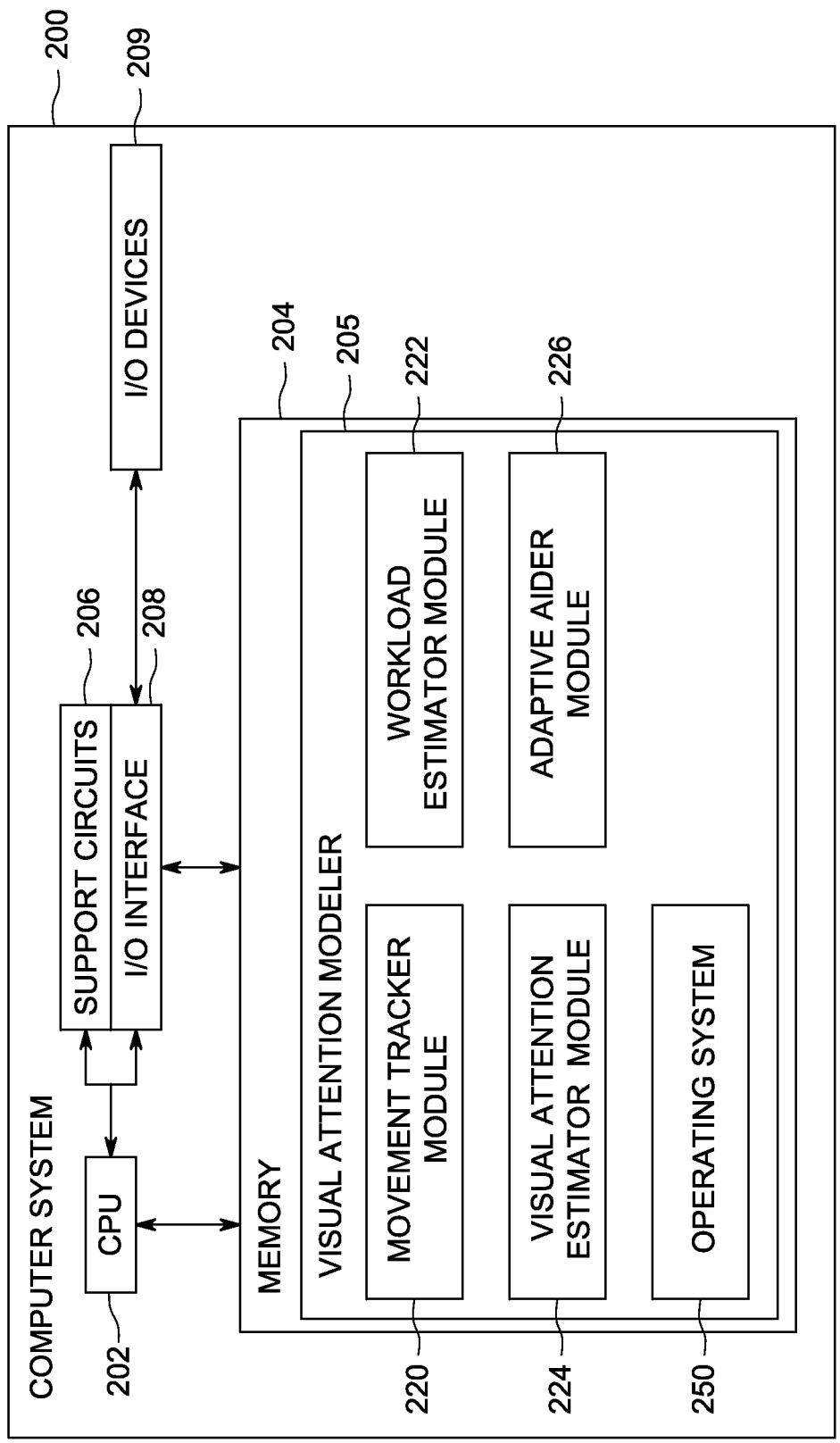
FIG. 2 is a block diagram of a computer system for implementing the visual attention modeler in accordance with embodiments of the present invention.

FIG. 2 is a block diagram of a computer system 200 for implementing the visual attention modeler 100 in accordance with embodiments of the present invention. The computer system 200 includes a processor 202, a memory 204 and various support circuits 206. The processor 202 may include one or more microprocessors known in the art, and/or dedicated function processors such as field programmable gate arrays programmed to perform dedicated processing functions. The support circuits 206 for the processor 202 include microcontrollers, application specific integrated circuits (ASIC), cache, power supplies, clock circuits, data registers, input/output (I/O) interface 208, and the like. The I/O interface 208 may be directly coupled to the memory 204 or coupled through the supporting circuits 206 [506]. The I/O interface 208 may also be configured for communication with input devices and/or output devices 209, such as, network devices, various storage devices, mouse, keyboard, displays, sensors and the like.

The memory 204 stores non-transient processor-executable instructions and/or data that may be executed by and/or used by the processor 202. These processor-executable instructions may comprise firmware, software, and the like, or some combination thereof. Modules using processor-executable instructions that are stored in the memory 204 comprise the movement tracker module 220, the workload estimator module 222, the visual attention estimator module 224 and the adaptive aider module 226.

The computer system 200 may be programmed with one or more operating systems (generally referred to as operating system (OS) 250), which may include OS/2, Java Virtual Machine, Linux, Solaris, Unix, HPUX, AIX, Windows, Windows95, Windows98, Windows NT, and Windows 2000, Windows ME, Windows XP, Windows Server, among other known platforms. At least a portion of the operating system 250 may be disposed in the memory 204. In an exemplary embodiment, the memory 204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

Figure 3:
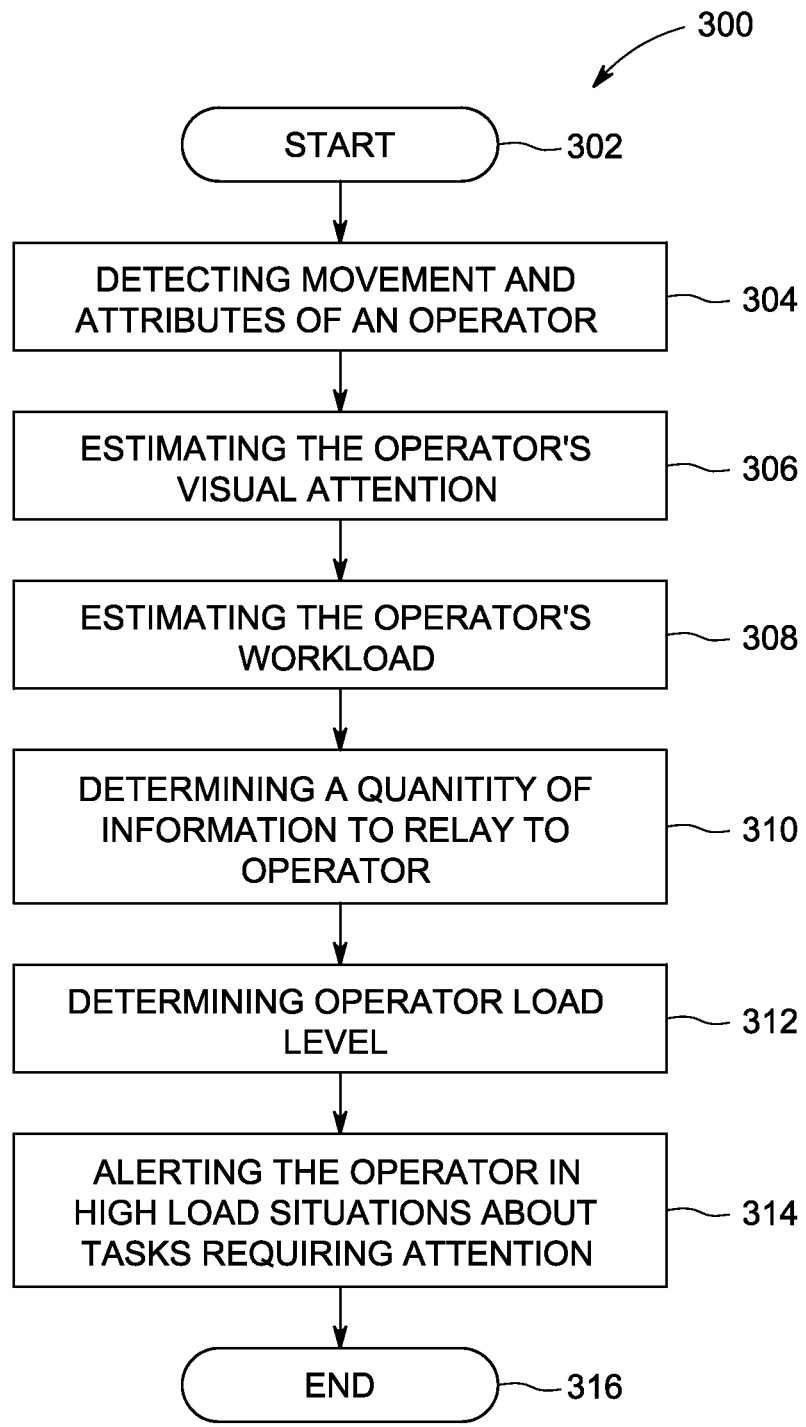
FIG. 3 is a flow diagram for a method for providing a quantity of information to an operator based on modeling visual attention in accordance with embodiments of the present invention.

FIG. 3 is a flow diagram for a method 300 for providing a quantity of information to an operator based on modeling visual attention of an operator in accordance with embodiments of the present invention. The method 300 is an exemplary implementation of the visual attention modeler 205 as executed by the processor 202.

The method begins at step 302 and proceeds to step 304. At step 304, the movement tracker module 220 detects movement and (optionally) attributes of an operator of an apparatus. At step 306, the visual attention estimator module 224 estimates the visual attention of the operator, and at step 308, the workload estimator 222 determines the operator's workload based on the visual attention and the movement and (optionally) attributes tracked by the movement tracker module 220 in step 304. At step 312, the module determines the operator load level from the workload and visual attention time.

The movement tracker module 220 monitors the operators tasks and stores the operator's current tasks in a database. At step 314, the adaptive aider module 226 optionally alerts the operator about tasks requiring the operator's attention by displaying appropriate information according to the operator load level. The adaptive aider 226 receives a list of tasks associated with the vehicle from the sensors 120, the panel 112, outputs from the vehicle, or from a pre-programmed input list of tasks. The method ends at step 316.

Figure 4:
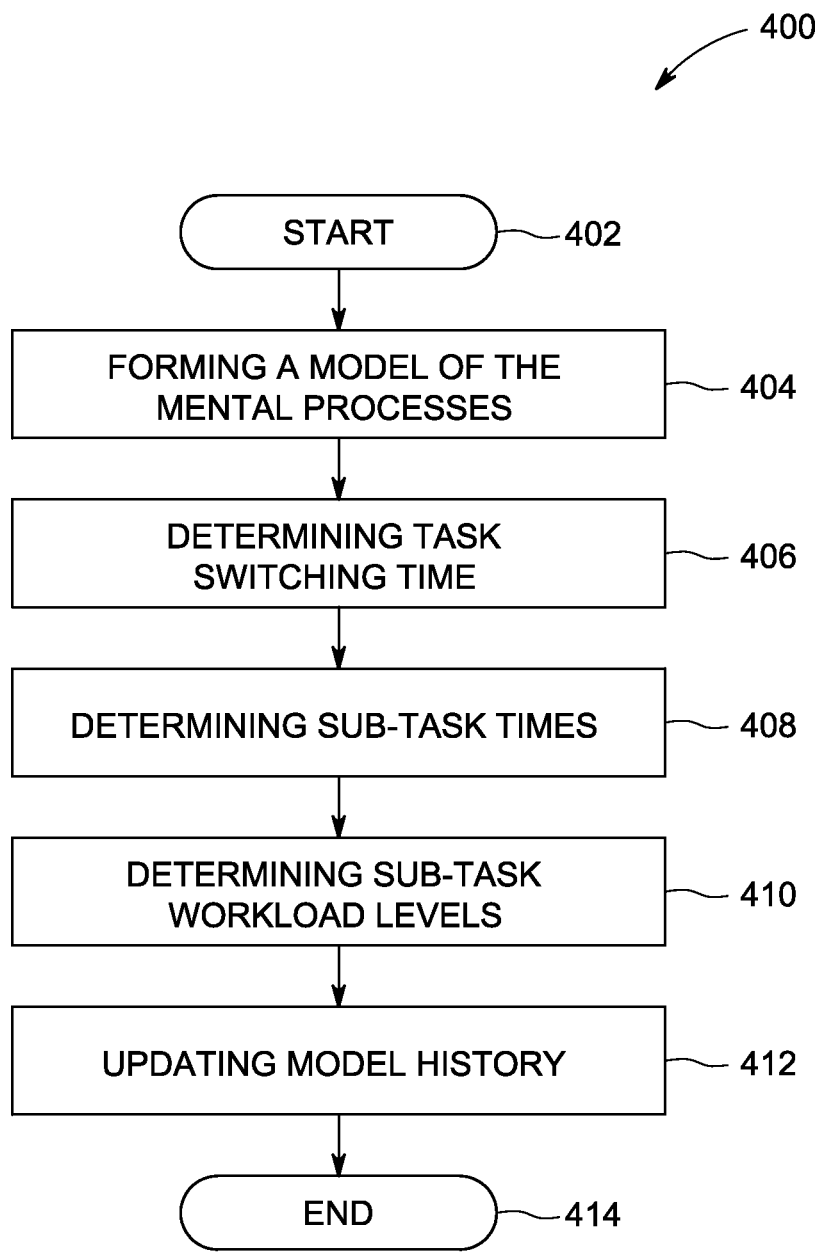
FIG. 4 is a flow diagram for a method for modeling visual attention of an operator in accordance with other embodiments of the present invention.
Figure 5:
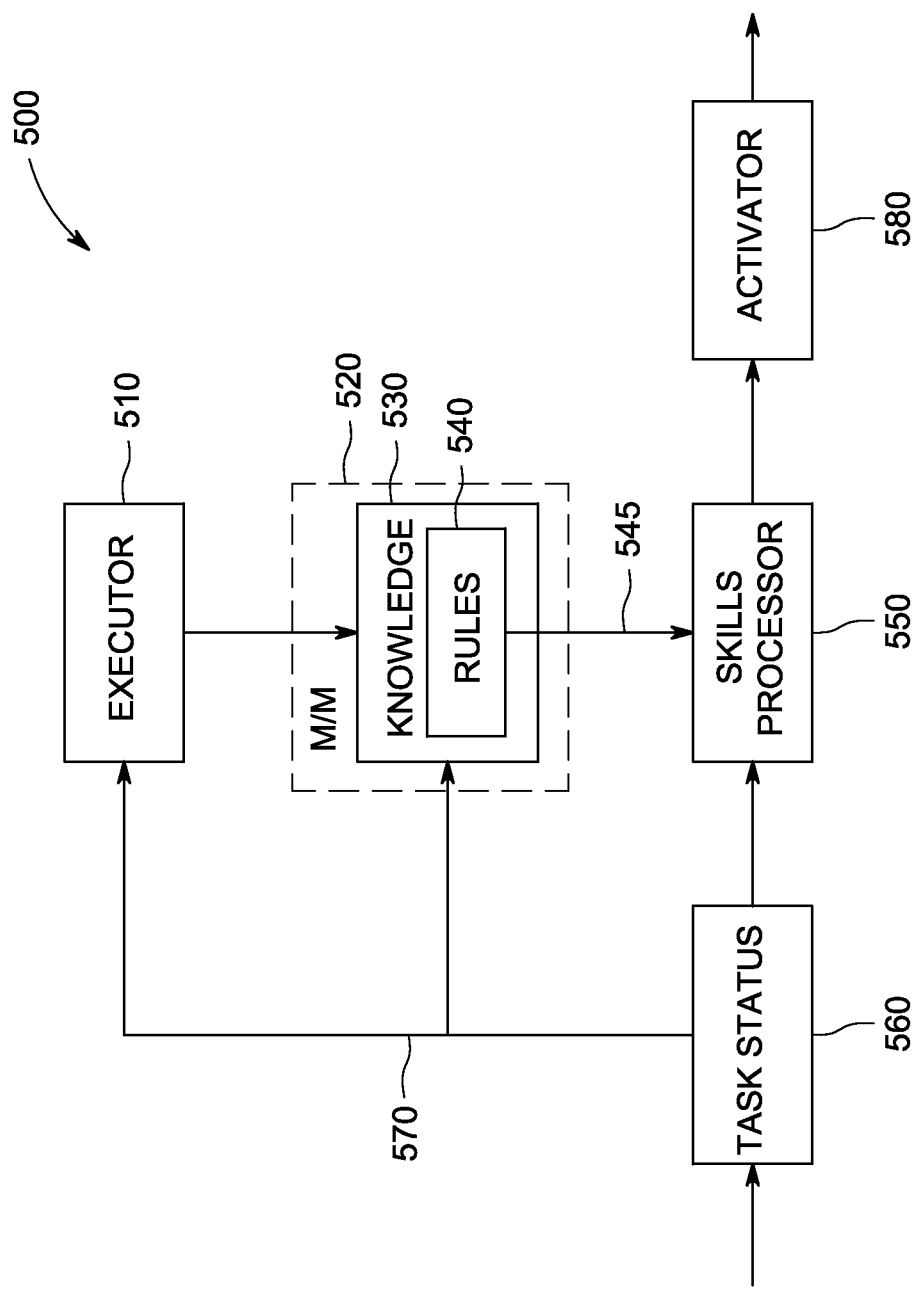
FIG. 5 is a schematic of a skill-rules-knowledge (SRK) information processing model of mental processes for modeling visual attention in accordance with embodiments of the present invention.

FIG. 4 is a flow diagram for a method 400 for modeling visual attention of an operator in accordance with embodiments of the present invention. The method 400 is an exemplary implementation of the visual attention modeler 205 as executed by the processor 202 in which task switching time is determined to assist the adaptive aider module 226. The method begins at step 402 and proceeds to step 404. At step 404, a computer model of the mental processes for the operator is processed based on the movements, attributes, and task status from the movement tracker 220 and a stored history of the mental model and movement activities. At step 406, the visual attention estimator module 224 estimates a task switching time. According to exemplary embodiments, an operator's task switching time is the time taken to modify the operator's mental model to move from one currently executing task, to another non-executed task. The length of time in switching from the currently executing task to the next task is significant for generating a mental model using the visual attention modeler 205 of the operator. The method proceeds to step 408, where the attention estimator module 224 estimates sub-task times for the task being performed, and at step 410, the estimator determines sub-task workload levels. At step 412, the module updates the model history. The method ends at step 412.

In a further embodiment, the invention incorporates a skill-rules-knowledge (SRK) information processing model 500 of mental processes in the visual attention estimator 224. In this embodiment, the SRK model consists of an Executor 510, task (mental) model bases 520 with Knowledge 530 and script Rules 540, and a Skills processor 550. A task status 560 is input 570 to the executor and task model base, and to the skills processor 550 with in turn output to an activator 580. Based on the task status, the executor directs selection of the task model, and in turn, the rules script with knowledge of the task parameters is downloaded 545 to the skills processors. Associated with these activities are micro-model times and workloads. With this embodiment, the model involvement corresponds to a hierarchy of cognitive processing in the task at the levels of natural reasoning, rules-based reasoning, knowledge recall, or task priming as determined by the executor. Here natural reasoning occurs at the skills processor where the stimuli are self evident from the features and maps directly to a schema for a motor response without cognitive evaluation. At a higher level, where the stimuli or schema is not as self evident, the rules processor must be evoked for evaluation and response decision. When confounded, knowledge of features or schema applicable to the task domain may have to be recalled. Finally, when switching tasks, the rules and knowledge constituting the task mental model may have to be primed to the applicable task domain.

In this embodiment, the skills-rules-knowledge (SRK) information processing model is a framework for a behavior micro-modeling of workload as developed for display control. In this model, the display control is represented as a sequence of sub-tasks each initiated by a path adjustment, and followed by mental preparation, an orientation on the display, and the execution of the subtask menu button activity. The control sequence consists of micro-model behavior elements and corresponding times. Eye movement time includes preparation and saccade.

For demonstration, multiple tasks such as those considered in this disclosure consisting of vehicle control interlaced with display control by touch panel or alternatively, by eye pointing, appropriate subtask activities may be as follows:

Path Adjustment—A sequence of over-learned, automatic activities consisting of a scene evaluation and path control action performed at the skill level. For the scene evaluation, the head is tilted up to look out while simultaneously the eyes are rotated toward the scene and then the vision accommodated to the distant view; if judged in need of path correction, the resulting visual perception guides two more eye movements for further evaluation of the path, a correction to the path is estimated, and the manual changes to the controls are executed in a discrete movement. One of four directions is selected in the path correction and the mental decision is made according to Hick's law in $150*\log_2(4+1)$ milliseconds as disclosed in Card, Moran, & Newell, 1983.

Mental Preparation—Recall of rule-based knowledge needed to prepare for the menu activity occurs in 1.35 s (Card, Moran, & Newell, 1980).

Orienting on the Display—At the skill-level, the head is tilted down to look inside the cab while simultaneously the eyes are rotated toward the display and then the vision accommodated to the near view. For the touch panel, the hand is moved at the same time guided by peripheral vision from the manual control display taking according to Welford's Version of Fitt's law (Card, Moran, & Newell, 1983).

Menu Button Activity—Menu activity consists of button selection and method activation in a rule-base directed activity. In selection, visual perception is used to locate the menu button in the visual field and the eyes are rotated toward the button. Four choices are possible for the menu-select button and the mental decision is made according to Hick's law. Menu-button activation follows depending upon the method utilized:

a. Eye-pointing activation—Three fixations are needed to focus on an icon feature of the button legend, with the first fixation to locate the icon and the remaining fixations to center on the feature (Carpenter & Just, 1978). This is followed by a decision to activate the button. To ensure coordination, the gaze is held while the selection switch is pressed and a tactile perception received.

b. Touch Panel Activation—The hand is moved from the side display to the center of selection display 'button' in according to Welford's Version of Fitt's law, with the 'button' pressed (or finger held), upon tactile perception of the touch screen surface.

In a further embodiment, associated with these subtasks are micro-times for execution and corresponding workloads as determined from expert consensus and verified by experimental studies. FIGS. 6A to 6D are a set of flowcharts and associated tables for some of the micro-modeled control tasks demonstrated in this disclosure. FIG. 6A is a flow diagram for the operation of a vehicle with a panel display. In FIG. 6A, the operator controls the vehicle 610 and if needed 612 activates the display 613 to operate the display menu 614 before returning 617 to vehicle control, otherwise continues 611 with vehicle control.

Figure 6B:
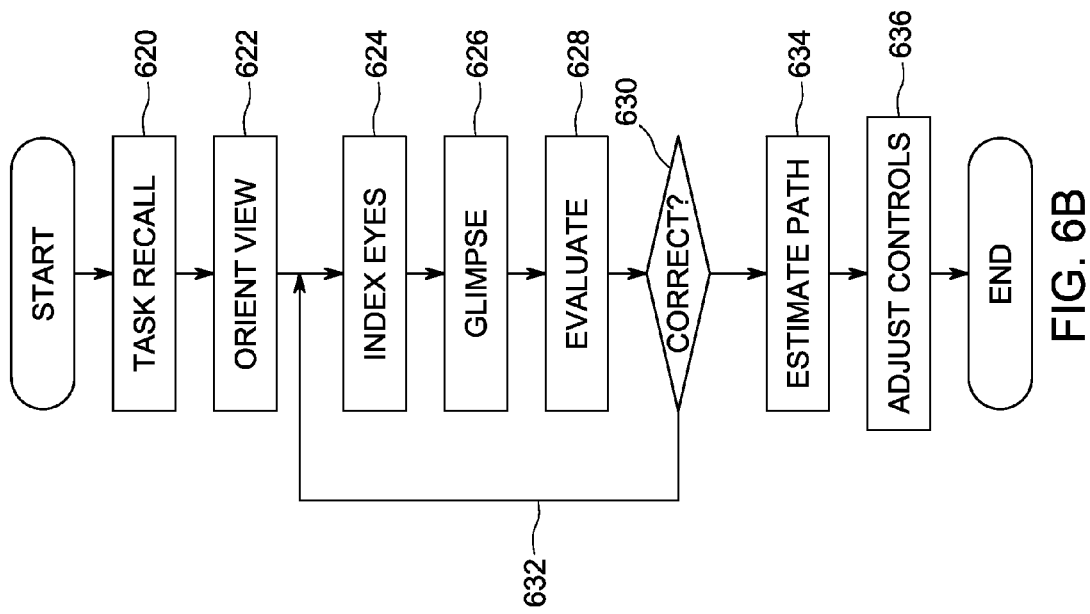
FIG. 6B is a micro-model level sub-task flow diagram for controlling a vehicle operated by an operator.
Figure 6A:
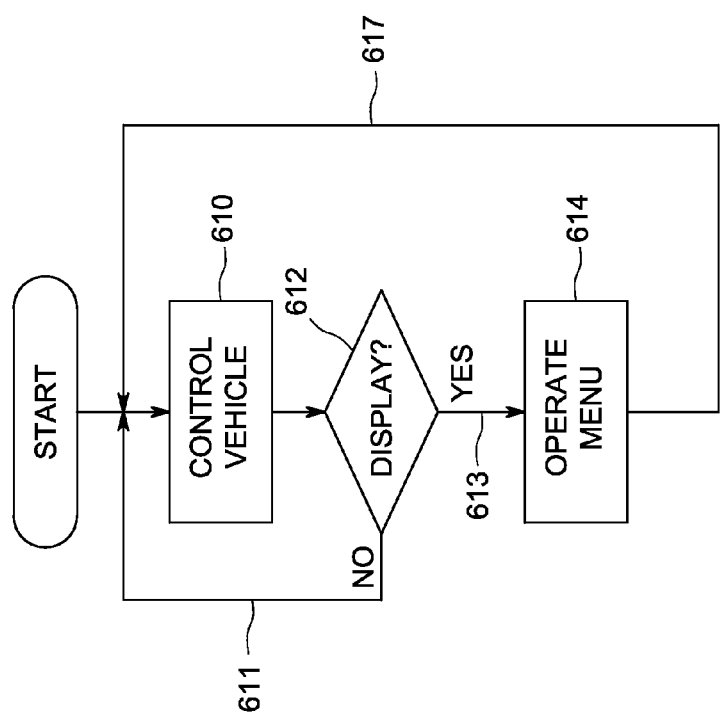
FIG. 6A is a flow diagram for the operation of a vehicle with a panel display.
Figure 6C:
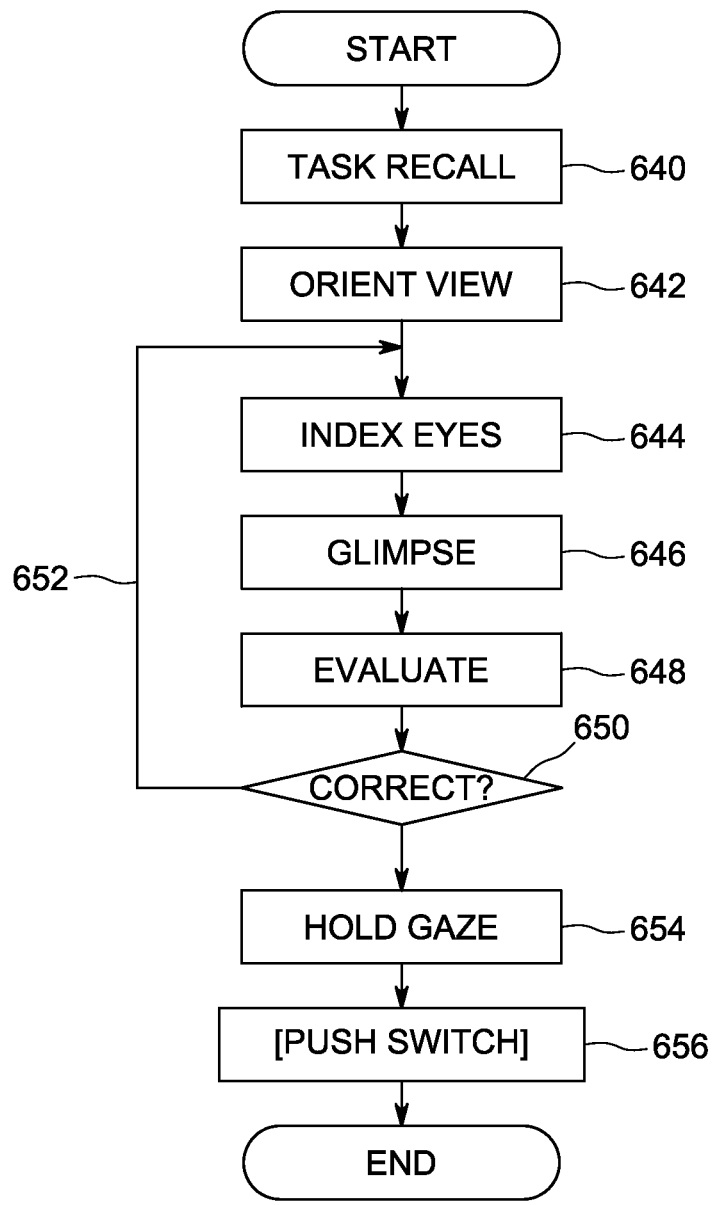
FIG. 6C is a micro-model level sub-task flow diagram for a method for activating menu keys on the panel display by touch panel in accordance with exemplary embodiments of the present invention.
Figure 6D:
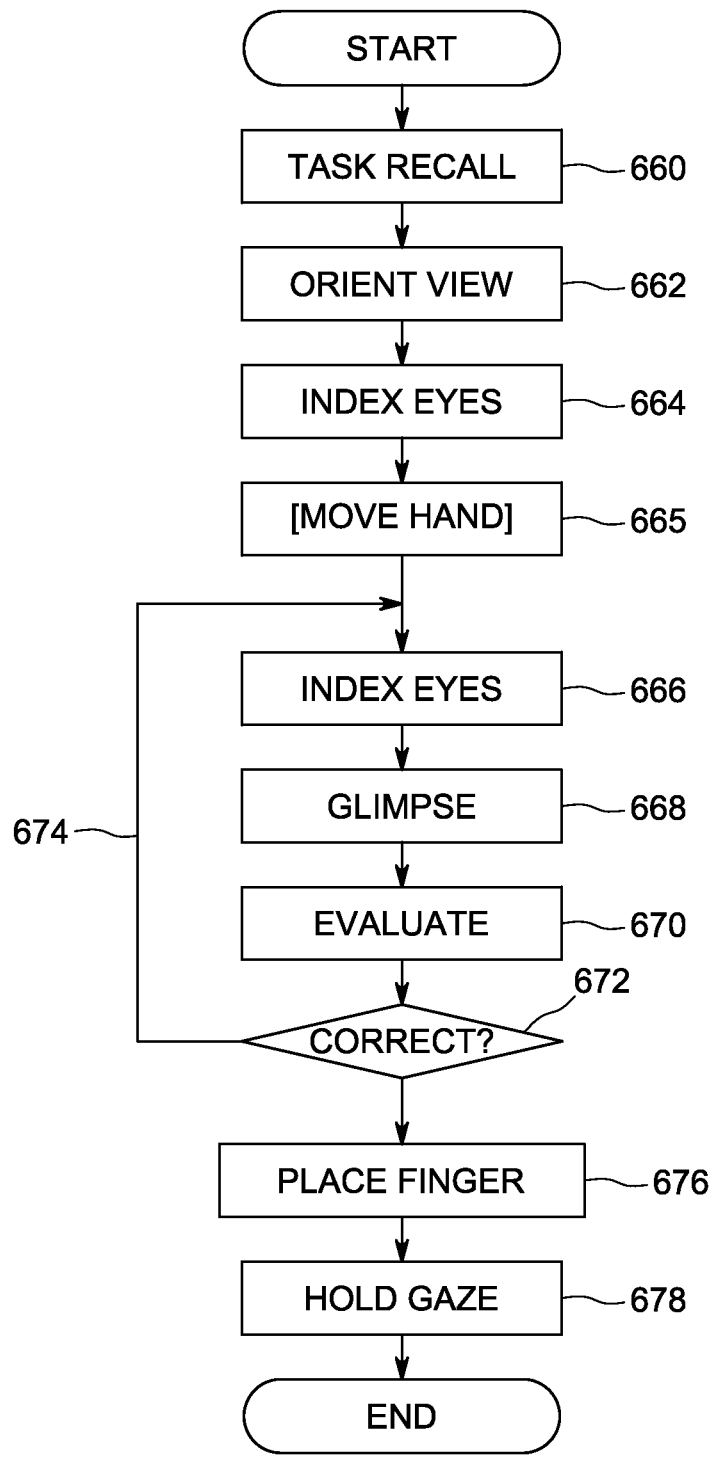
FIG. 6D is a micro-model level sub-task flow diagram for a method for activating menu keys on the panel display by eye-pointing in accordance with exemplary embodiments of the present invention.

FIG. 6B is a micro-model level sub-task flow diagram for controlling a vehicle course, while Table 1 is the table of micro-times and workload associated with the task. FIG. 6C is a micro-model level sub-task flow diagram for operating a menu display by eye-pointing; Table 2 is the associated table of micro-properties. Finally, FIG. 6D is a micro-model level sub-task flow diagram for operating a menu display by touch panel; Table 3 is the associated table of micro-properties. All micro-model level sub-task flow diagrams 6B to 6D are much the same with task recall, orientation, and task activation. For example, in FIG. 6B, while recalling the control task, the operator's eyes are indexed outward as the operator moves his/her head up to look out of a vehicle cab; then perceiving a glimpse of an outdoor scene, the operator repeats the process of indexing his eyes and perceiving the scene to acquire scene features for course evaluation (as determined by a tactical-branch); and finally estimating the path from the glimpsed scene, the operator uses manual motor action to adjust the vehicle controls. FIGS. 6C and 6D are micro-model level sub-task flow diagrams for activating menu keys on the panel display. Activating the menu keys involves mental preparation (Recall of rule-based knowledge needed to prepare for the menu activity) since they are activated following vehicle control. In this process, the operator mentally prepares for the change in tasks while shifting his/her head down toward the display and indexing eyes to look inside the cab area to perceive a glimpse of the display in preparation to activate the menu key. Consequent key action is done without the mental preparation, since here the operator is already primed for the task following vehicle control.

Elaborating further, in FIG. 6B, the operator in controlling the vehicle recalls the task 620, orients the view to the outside scene 622, executes a sequence of indexing eyes 624 glimpses 626 and evaluating glimpse 628 until 632 the pertinent features 630 are processed, and then estimates the path 634 while adjusting the vehicle controls 636. Table 1 lists the micro-modeled activities ('activity') of the task; the micro-time ('millsec') for the activity; the SRK model component ('base') involved in the activity, here listed as 'Skill' as opposed to 'Rules' or 'Know' for Knowledge; the presumed cortical structure involved in information processing activity, here listed as 'parietal' for presumed visual-parietal involved in natural eye-hand coordination, or 'frontal' for frontal lobe involved in cognition, and the effector of muscular motor activity: 'ocular' for eye movement (or fixation), 'head' for head movement, or 'manual' for limb and finger movement; the associate workload ('Loading') and the class of activity on which the workload estimate is based ('verbal anchor'), and the resulting incurred task workload ('workload') on which the cost computations are based. Note that some activities occur together at the skill-based level, such as orienting and indexing eyes; these concurrent times are listed in brackets in the table.

FIG. 6C shows the operator in controlling the menu by eye-pointing recalls the task 640, orients on the display 642, executes a sequence 652 of eye indexes 644 with glimpses 646 and evaluations 648 until the control choice is made 650, and then while holding gaze 654 on the display element, pushes the activation switch 656. Similarly, Table 2 shows concurrent activity for switch activation while holding a gaze. FIG. 6D shows the operator in controlling the menu by touch-panel recalls the task 660 and while orienting on the display 662, concurrently indexes eyes 664 and moving the hand 665 to the display as guided by the peripheral vision, executes a sequence 674 of eye indexed 666 glimpses 668 and evaluations 670 until the control choice is made 672, and then places 676 and holds a finger 678 on the display software 'button' as the menu choice. Similarly, Table 3 shows concurrent activity for moving the hand to the display as guided by peripheral vision.

An exemplary embodiment of the present invention follows from the results of a study investigating the use of eye-pointing compared to touch panels in the performance of the dual tasks of control operations and vehicle navigation in a helicopter simulator. As well as performance effects, the study determines the different eye-movement strategies needed for dual task performance and the results are used in a micro-model to extrapolate the performance to different display designs as an embodiment of the present invention. In the following, the experimental method and results are summarized as demonstration.

Figure 7A:
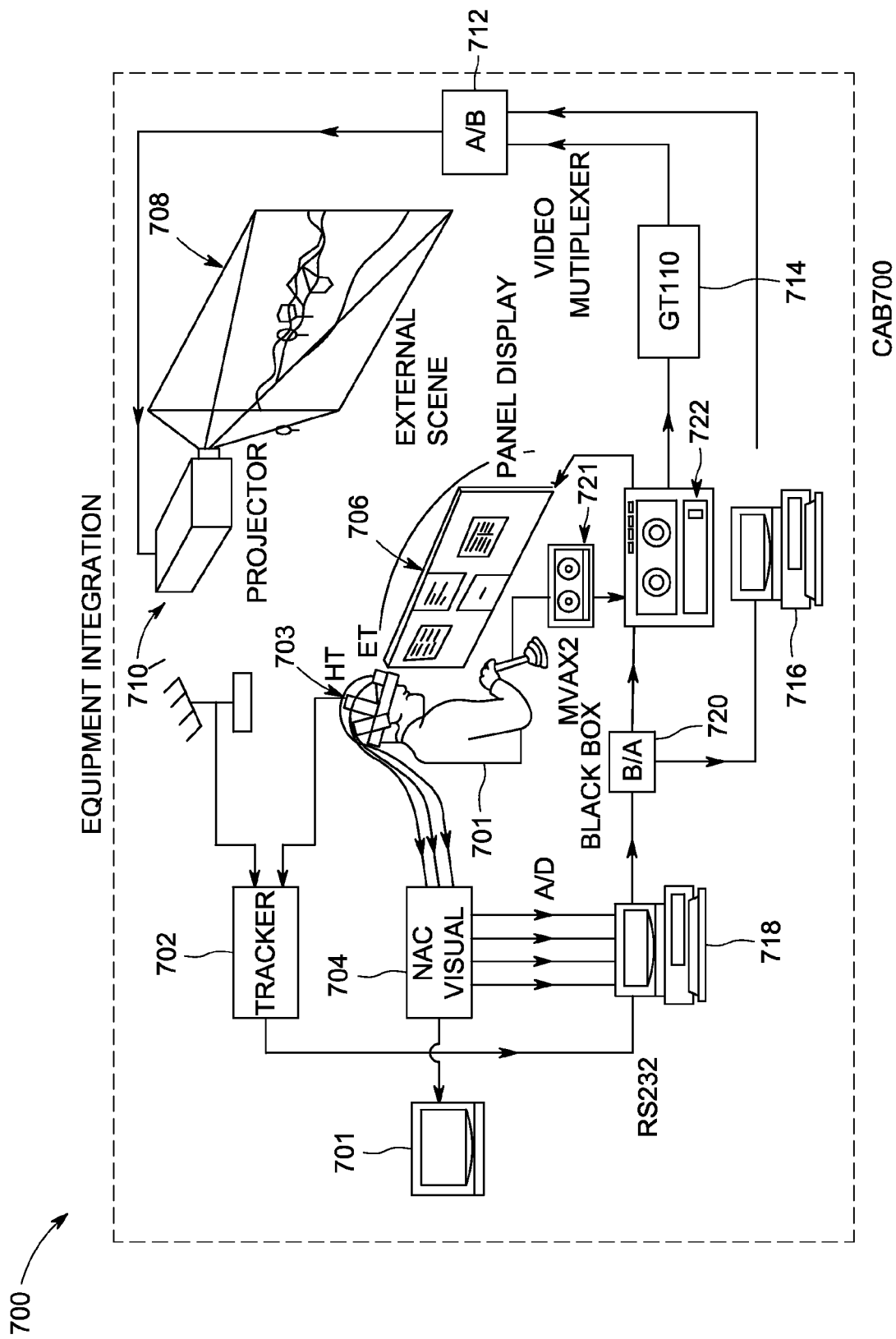
FIG. 7A is a block diagram of an implementation of the apparatus in accordance with one exemplary embodiment of the present invention, showing the integration of a helicopter simulator with an eye tracking system.

Apparatus:

FIG. 7A is a block diagram of an implementation of the apparatus 100 used in the study in accordance with one exemplary embodiment of the present invention, showing the integration of a helicopter simulator with an eye tracking system. In FIG. 7A, an operator 701 is in the cab 700 looking out at the external scene on the projection screen 708 and down at the panel displays 706 with the touch panels (TP). The operator is wearing a head mounted fixture with the eye-tracker (ET), a NAC Eye Mark Recorder®, for measuring eye movement and the Polhemus® sensor (HT) for measuring head-movement attributes, collectively referred to as sensors 703. The Polhemus® magnetic field source is mounted on the canopy of the cab frame above the head of the participant.

The computer system 718 receives digital electrical inputs from the Polhemus processor and tracker 702 and analog input from the NAC Visual data output unit. The video output of the Eye Mark recorder may be displayed on a monitor 701 for reference. The digital electrical output of the computer system 718 is routed through a two-way switch box (B/A) 720 to either a VAX computer system 716 or a Silicon Graphics computer 722. Output from the Silicon Graphics Computer 716 enables training of the operator in menu control with the eye-tracker (ET), prior to application.

When the simulator is operating, the analog electrical signals from the hand and foot controls are sampled by a MicroVAX 721 and the digital electrical output is input to the VAX computer system 722. The VAX computer system 722 sends digital electrical signals to the panel displays 706 in the simulator cab 700 and to the GT110 terrain imaging system 714. Either the video output from the GT110 714 or that from the Silicon Graphics Computer 716 is forwarded to a projection system 710 via a video multiplexer (A/B) 712 for display on the forward projection screen.

Tasks:

An exemplary task of the operator 701 is to range a target from an observation site and then compose and send an intelligence spot report from the upper-center panel message display 706 while flying a vehicle (e.g., a plane) in a designated flight path at a specific altitude and speed using a left-most panel as a vertical situation display (VSD), a bottom center panel as a tactical situation display (TSD) in the panel display 706 for guidance, and the right-most panel displays system-status. The flight phases were in the following sequence: (1) observation, (2) departure flight, (3) spot report message, and (4) baseline flight. These phases are described in greater detail as follows:

Observation: An exemplary trial scenario starts with the vehicle (e.g., a helicopter) unmasked over an observation site at an altitude high enough to observe the surrounding terrain displayed on the projection screen 708. The operator 701 locates and ranges a vehicle target with the simulated ship borne laser range finder (i.e., via a red circle superimposed over the target image on the projection screen from the imaging system), using eye-pointing and the acquisition switch to designate the target, and as the operator 701 does so, recognizes and memorizes the vehicles in the area.

Departure Flight: The operator 701 maneuvers the helicopter to the altitude and direction of the departure flight route. In doing so, he returns to near ground level and proceeds at a nap-of earth (NOE) altitude to leave the site along the flight path.

Spot Report Message: After having reached the departure flight path, the operator 701 composes and sends an intelligence spot report on his observations while flying using the panel message display. The operator 701 initiates the message composition task by first selecting the spot report from the message format display. The operator 701 may select from three formats for the spot report: the number of vehicles, the vehicle type, and the vehicle movement direction.

The operator 701 selected the appropriate data on the panel display 706 using the touch screen buttons or eye-pointing and the confirmation switch. On the last display, the operator 701 simulates sending the spot report to higher headquarters via digital radio, an action that returns the display to the message selection format. The participant is informed that in the simulation the onboard processor augments the intelligence report with the range information and bearing to give target location, bearing, and time.

Baseline Flight: Guided by the flight cues on the VSD monitor, the operator 701 continued to fly the simulator along the departure route navigating nap-of-earth (NOE) among the terrain images.

Figure 7C:
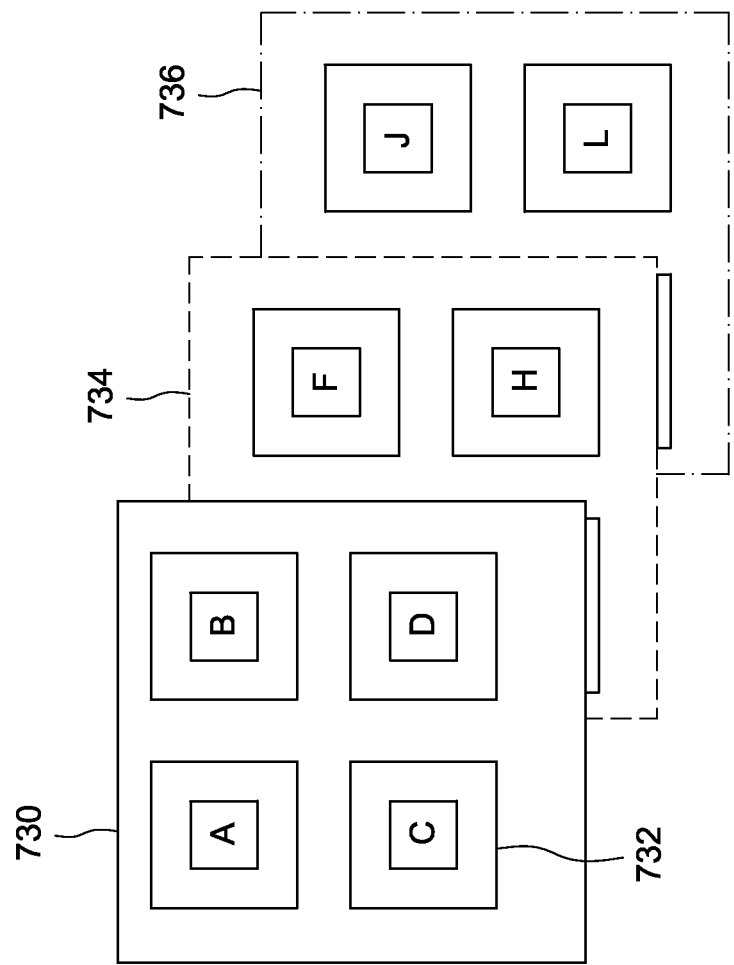
FIGS. 7B and 7C depict video display formats that correspond to different format control strategy in the panel display 706 of FIG. 7A in accordance with exemplary embodiments of the present invention.
Figure 7B:
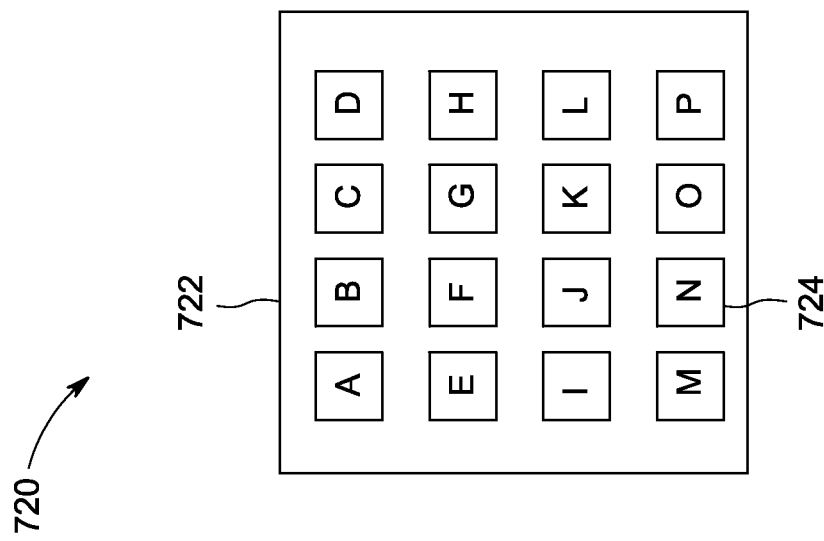

Display Formats:

FIGS. 7B and 7C depict video display formats that correspond to different format control strategy in the panel display 706 of FIG. 7A in accordance with exemplary embodiments of the present invention. FIG. 7B shows a menu 720 with smaller sized icon elements 722 that may be selected using a fine resolution technology such as a touch panel. In this figure, the menu is not treed. FIG. 7C shows a menu 730 with a larger sized icon element 732 that may be selected with a coarser resolution technology such as needed for an eye tracker; since the selections are widely spaced fewer may be presented on one menu and the remaining options are successively presented in format 734 and then format 736 in a treeing scheme. In this study, the menu of FIG. 7C was used for both the eye-pointing and touch-panel methods as demonstration.

Participants:

Twelve male army-reserve, national-guard military helicopter flight qualified commissioned officers, rank warrant or above served as operators in this study Experimental Design:

A within-subject fixed factorial design with flight phase, control method, cycle, test site, and route sequence as fixed factors. The experiment was conducted in four consecutive phases: target acquisition, a short departure flight, a spot report phase, and a baseline flight. Although the display control methods were not used in the departure and baseline flights, the phases were tested for preparation and carryover effects by the methods. The dependent measures were the phase time durations, errors, flight performance measures (speed, heading, above-ground altitude, pitch, roll), the flight control settings (collective, pitch, roll, yaw), altitude-stability control measures (gain, phase, remnant), and eye fixation shifts inside and outside the cab.

Procedure:

The display control methods and the observation site routes were assigned in a Latin Square design. The sites were grouped into two routes, with seven sites to a route, four training and three testing. The sites of both routes were tested with both methods in two test cycles, but in difference sequences. In the first test cycle, the participant trained with the first control method of the assignment at the four training sites of the first route of that assignment and then tested at the three test sites of that route. He next trained with the second control method at the four training sites of the second route and then tested at the three test sites of that route. In a second test cycle, he then tested at the three test sites of the first route with the second method, and then tested at the three sites of second route with the first method, with the sites in a different sequence. He experienced all four phases at each site.

Statistical Analysis:

A parametric mixed general linear model with the phase, method, cycle, site, sequence, phase-by-method interaction, and phase-by-cycle-by-method interaction as fixed factors, and the subjects within cycle as the random factor. Where parametric models were employed, contrasts were conducted as planned comparisons among conditions. All post-hoc paired comparisons of main effects were multiple comparison least significant differences tests. Cluster analyses were applied to significant interactions where appropriate.

Performance for the Spot Report:

The results of the statistical analyses are reported first for the times and errors of the spot-report task in totality. This is followed by the results for the times and errors of the subtasks for specifying the target number, type, and direction from the menus; the Next button brings up the next menu and the Send button completes the spot report.

Task in totality:

The message composition time is significant by method ($F[1,126]=72.878$, $p=0.000$), with eye-pointing (28.69 s/1.56) taking 2.24 times as long as the touch panel (12.83 s/1.11). Similarly, the error is significant by method ($F[,126]=5.934$, $p=0.016$), with eye-pointing having 1.74 more errors per trial (0.653/0.09) as the touch panel (0.375/ 0.07).

Subtasks:

The subtask time is significant by the cycle-by-method-by-display button interaction ($F[5,826]=3.468$, $p=0.004$). The subtask error is significant by method ($F[1,406]=5.089$, $p=0.025$), with more errors for the subtasks with eye-pointing than the touch panel. A Two-step Cluster analysis of the subtask times by the cycle-by-method-by-display button interaction results in five clusters with centroid mean time and standard deviation; the overall mean of 3.57 s separates clusters (a) and (b) from the rest. The factorial treatments associated with the clusters are as follows: Cluster (a) contains both Next and the Send buttons with the touch panel for both cycles, cluster (b) the Number and Direction buttons with the touch panel for both cycles, cluster (c) all buttons except the Type with eye-pointing for the $1^{st}$ cycle, cluster (d) all buttons except the Type with mostly (97.3%) eye-pointing for the $2^{nd}$ cycle, and cluster (e) the Type button for both methods and both cycles.

Considering the associated factorial treatments, there is reason to group clusters (a) and (b) together as one group (N=360) with mean time 1.972 s (0.238) and the remaining clusters as a second group (N=504) with mean 4.708 s (0.239). A Discriminant Function analysis by the two groups ($R^2$=0.847, Wilks' Lambda=0.283, Chi-square=1084.779, df=4, p=0.000), shows that according to the standardized coefficients, the method (1.003) is the important independent variable, but less so the button (0.110), and neither the cycle (0.000) or direction (0.000) at all. Considering time as a separation variable, a cutoff threshold for the two groups is 3.567 s, computed as the sum of the means weighted by the group sizes; this is equal to the cluster overall mean of 3.57 s reported above.

Flight Performance for Departure, Message and Baseline Phases:

The trial grand average flight performance and RMS variation of averages by phase, with speed in fps, heading in degrees, altitude in feet, and pitch and roll in degrees are as follows.

Speed:

Average speed is significant by phase (F[2,406]=467.401, p=0.000); with less average speed (p=0.000) during the departure than the spot-report or the baseline; this is because the craft is accelerating from the hover to the flight path during the departure. RMS variation significant by phase (F[2,406]=821.301, p=0.000), with more variation (p=0.000) during the departure than the spot report or baseline, and less variation (p=0.004) during the spot report than the baseline.

Heading:

RMS variation significant by phase (F[2,406]=164.659, p=0.000); with more variation (p=0.000) during the departure than the spot report or the baseline.

Altitude:

Average above-ground altitude significant by phase (F[2,406]=15.868, p=0.000), with greater altitude (p=0.000) during the departure and spot-report than during the baseline. RMS variation significant by the phase-by-method interaction (F[2,406]=6.802, p=0.001), with less variation with the touch-panel during the spot-report (8.904 ft/1.156) than with eye-tracking during the spot-report (17.062 ft/1.156) or the baseline flight following either method (ET: 17.217 ft./1.156, TP: 16.609 ft./1.156), which in turn has less than the preceding departure flight (ET: 19.922 ft./1.156, TP: 18.9679 ft./1.156).

Pitch:

Average pitch significant by phase (F[2,406]=105.163. p=0.000), with more pitch (p=0.001) during the departure than during the spot report or baseline, and more (p=0.001) during the spot report than the baseline. RMS variation significant by phase (F[2,406]=272.557, p=0.000), with more variation (p=0.000) during the departure than the spot report or baseline, and less (p=0.000) variation during spot report than the baseline.

Roll:

Average roll significant by phase (F[2,406]=5.644, p=0.004); although the roll is slight, there is more negative roll (p=0.001) for the spot-report than the departure, and the baseline is slightly positive. RMS variation significant by phase (F[2,406]=18.230, p=0.000), with less variation (p=0.000) during the spot-report than during the departure or baseline.

Flight Control Activity for Departure, Message, and Baseline Phases:

Results are for the trial grand average flight control activity and RMS variation of averages by phase, with all measures in sampled values.

Collective Power:

Average collective power significant by phase (F[2,406]=314.510, p=0.000), with more power during the departure than the spot report or baseline. RMS variation significant by the phase (F[2,406]=82.115, p=0.000), with more variation (p=0.000) for the departure than the spot report or baseline and more variation (p=0.000) for the baseline than the spot report; and significant by the phase by method interaction (F[2,406]=3.631, p=0.027), with 1.69 times more power variation with eye-pointing (48.748/6.057) than the touch panel (28.834/6.057) during the spot-report, but still more in the baseline following both methods (ET: 66.247/6.057, TP: 78.842/6.057) and the departure before (ET: 116.735/6.057, TP: 115.677/6.057).

Cyclic Pitch:

Average cyclic pitch significant by phase (F[2,406]=107.654, p=0.000), with more cyclic pitch (p=0.000) during the departure than the spot report or baseline, and more (p=0.005) during the spot-report than the baseline. RMS variation significant by phase (F[2,406]=298.888, p=0.000), with more (p=0.000) variation during the departure than the spot report or baseline, and more (p=0.000) during the baseline than the spot-report.

Cyclic Roll:

Average cyclic roll significant by phase (F[2,406]=4.944, p=0.008), with more (p=0.009) cyclic roll during the spot report than the departure and baseline. RMS variation significant by phase (F[2,406]=61.585, p=0.000), with less (p=0.000) variation during the spot-report than the departure or baseline, and less (p=0.018) during the baseline than the departure.

Pedal-Yaw:

Average pedal-yaw significant by site (F[4,406]=2.783, p=0.026); RMS variation in pedal yaw significant by phase (F[2,406]=467.990, p=0.000), with more variation during the departure than the spot report or baseline.

Altitude Control Stability for Message and Baseline Phases:

Significant by the method-by-flight phase interaction are the control gain (F[1,28]=9.163, p=0.005), control phase (F[1,28]=4.785, p=0.037), and remnant (F[1,28]=28.299, p=0.000). The control gain is less with the touch panel for the spot report than with eye-pointing or the following baseline flights. Similarly, the control phase is less with the touch panel for the spot report than with eye-pointing or the following baseline flights. However, the remnant is more with the touch panel for the spot report than eye-pointing or the following baseline flights. While the frequency responses for the spot report task with eye-pointing are very similar to those for the baseline flights, those for the spot report with the touch panel are different from the others, most noticeably in the 0.5 Hz frequency region.

Eye Fixation Shifts:

The number of eye shifts into the cab area is significant by the flight phase by method interaction (F[2,299.093]=13.036, p=0.000) with less shifts for the touch panel during the spot report than eye-pointing, or during the following baseline flights; all of these are less than the number of eye shifts for the departure flights. Table 4 lists the number of eye-shifts by phase for each method. The fraction of the task-time spent viewing the cab area is significant by phase (F[1,298.137]=382.366, p=0.000), with more time (p=0.000) spent in the spot-report, than the baseline or departure, and more time (p=0.000) in the departure than the baseline. The average inside-viewing duration per eye shift is significant by phase (F[2,277.694]=52.721, p=0.000), with more time (p=0.000) for the spot report than the departure or the baseline. The eye-shift rate is not significant; the mean rate is 0.171 per sec (0.010), a glance inside on the average once every 5.85 seconds.

Family-Wise Significance:

To control the Type I error, the overall family-wise alpha level of 0.05 was partitioned among the statistical tests with the Holm simultaneous testing procedure. A total of 35 statistical tests was applied and the resulting partitioning produces a threshold alpha level of p=0.005. With this reasoning, the statistically significant tests include the spot report task time, the subtask times, the flight performance and control activities, the altitude control stability gain and remnant, and the eye-shift analyses.

The differences by method in the altitude variation, collective power variation, altitude stability control gain and remnant, and the task times for the spot report, are a result of the differences in visual attention and hand control strategies used for operating the menu buttons of the displays, as described in the following:

Flight Performance:

As instructed, the participants followed essentially the same flight path for both the spot report and baseline maintaining the same speed and heading. The difference in performance for the departure was because the vehicle was accelerating from the hover to the flight path. The division of visual attention for the dual tasks of operating the displays and vehicle during the spot report presumably leads to increased above-ground altitude, decreased speed variation, increased pitch, less pitch variation, and less roll variation compared to the baseline. Similarly, there is less variation in collective power, and cyclic pitch and roll. The participants operated at a higher altitude and pitch to avoid ground variations.

Flight Control:

The decreased variation in above-ground altitude with the touch panel was a result of removing a hand from the flight controls to operate the panel; correspondingly, there was 0.60 times less collective power variation than with eye-pointing. The decreased control gain and increased remnant for altitude stability with the touch panel reflect this control strategy for the touch panel. The gain, phase, and remnant results suggest a maximum impact on performance of about 0.5 Hz, or every two seconds, roughly the time to remove a hand from the controls, reach the panel, and return. The relatively stable flight path during the spot report and baseline justifies treating the altitude stability control as a single axis control problem.

Visual Attention:

The visual attention was dictated by the primary task of navigating the vehicle along a set flight path, an activity that required continual checking of first the terrain ahead to avoid obstacles and then the flight instruments for a course correction. The visual effort for operating the displays was fitted between these visual samples needed for navigation. The participants on the average glanced inside the cab once every 5.85 seconds to check the flight instruments and during the spot report, to operate the displays, before looking back outside at the scene. The time spent looking inside during a sample period depended upon the phase; while they spent on the average 2.06 seconds looking inside during the departure and 1.92 seconds during the baseline, or an average of 1.99 seconds to check the instruments, they spent 4.48 seconds looking inside during the spot report. These sample times agree (within standard errors), with the phase time spent viewing the inside cab area, that is, while 32% of the time was spent looking inside during the departure and 25% during the baseline, 75% was spent in the spot report. While they spent 3.93 seconds of a sample period viewing the flight scene during the departure and 3.79 seconds during the baseline, an average of 3.86 seconds, they spent 1.37 seconds during the spot report, time enough for only a quick glance made possible by the higher above-ground altitude. The amount of sample duration that could be devoted to additional visual tasks is limited by the time needed to survey the flight scene; this limit was reached during the spot report with eye-pointing since the task time was increased to accommodate the increased number of samples needed. The 28.69 seconds task time with eye-pointing was 2.24 times the 12.83 seconds for the touch panel; equivalently 4.883 eye shifts into and out of the cab area were made with eye-pointing as compared to 2.051 shifts for the touch panel, which is about the same ratio.

Figure 8A:
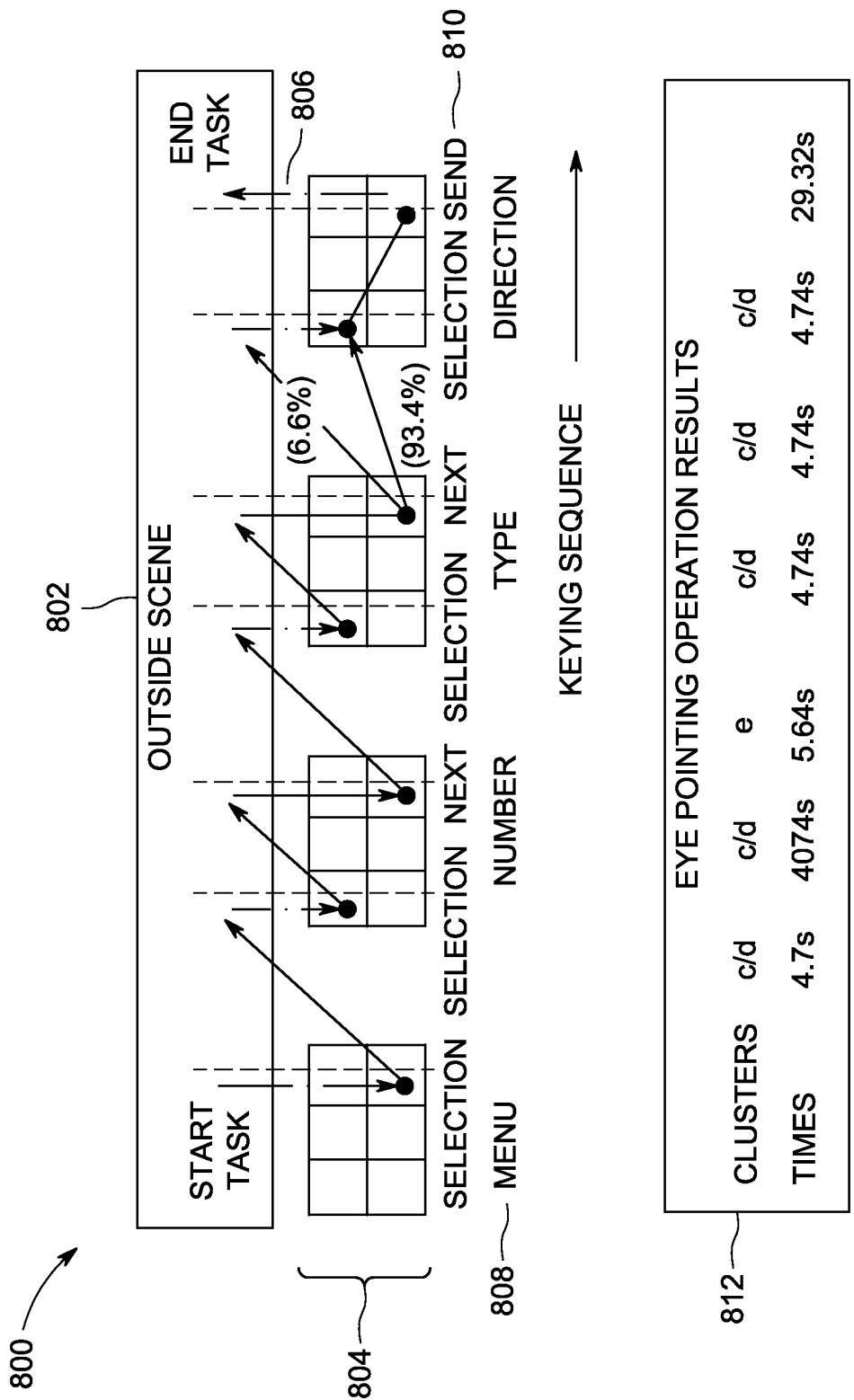
FIG. 8A is schematic summarizing the eye-movements for eye-pointing control of a panel display during an experiment for micro-modeling visual attention.
Figure 8B:
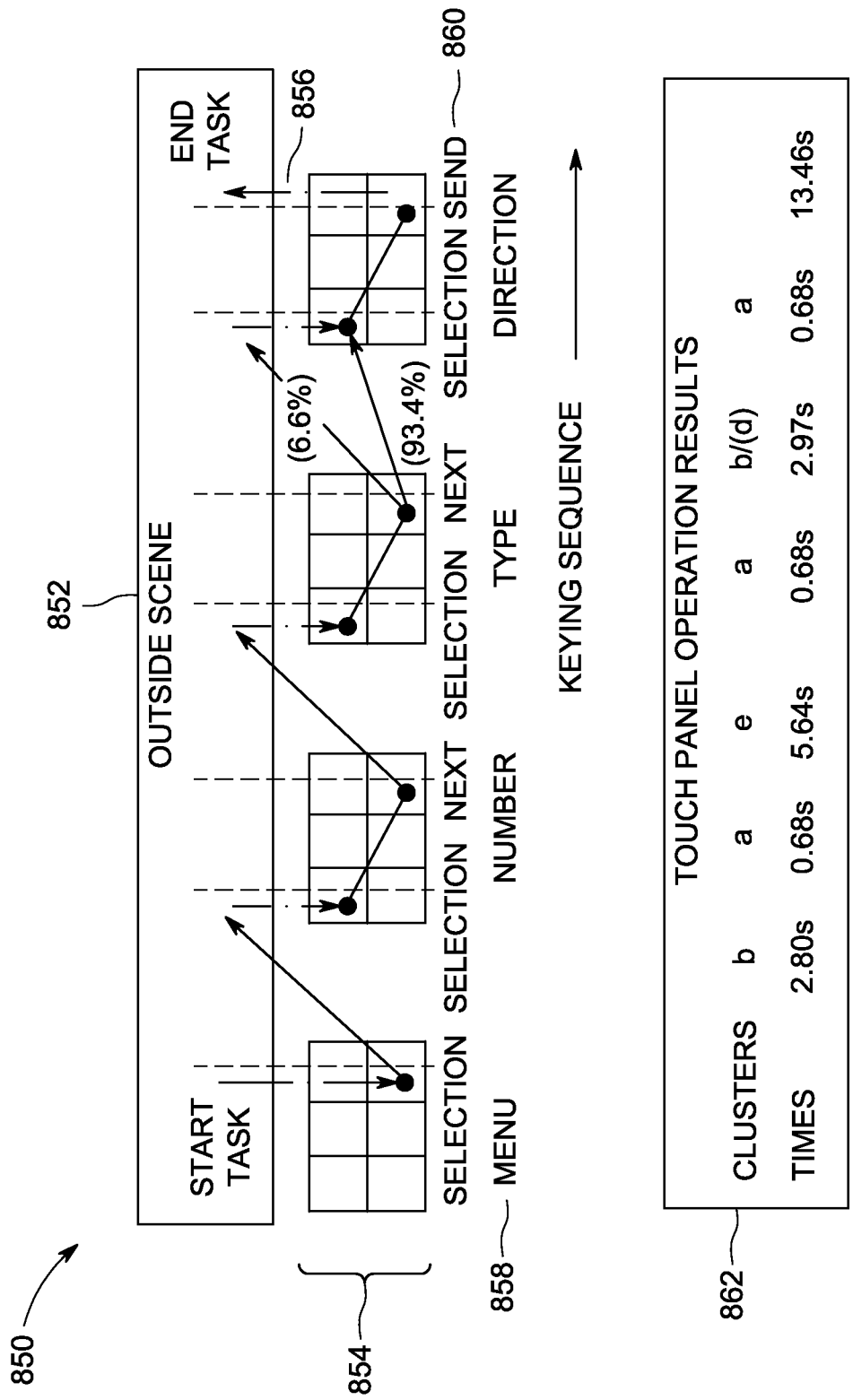
FIG. 8B is schematic summarizing the eye-movements for touch panel control of a panel display during an experiment for micro-modeling visual attention.

Display Control Strategies:

Different display control strategies were observed during the experiment for the two methods. These strategies are a result of the different times needed to operate the menu buttons. Essentially, in the touch-panel strategy the button time was short enough that the participant could in the main group the menu selection and exit together between scene glances; this was particularly possible because of the short exit time. In the eye-pointing, the button time needed was too large to accomplish this and the participant spaced the menu selection and exit with scene glances. The scene glances occurred at a regular rate and the fitting of the button actions between these glances determined the spot report time. FIGS. 8A and 8B are adjacency layout diagrams of eye movement links between the outside scene and the sequence of spot-report menu displays for the two methods; the figures brings together the observations on the control strategies and the results for the associated eye-shifts and subtask clusters.

Eye-Movement Links:

For eye-pointing operations 800 (FIG. 8A), the eye movement links 806 are between the outside scene 802 and a button action 810 Selection, Next, or Send for four of the six buttons on the menus 808; this is also the case for 88% of the fifth button in the keying sequence. The eye pointing operation results 812 list the cluster sets and cluster-times for the menus. The sum of the cluster times for the eye-pointing task is 29.32 s, well within the 95% CI for the corresponding experimentally derived task times.

Touch-Panel Links:

For the touch panel operations 850 (FIG. 8B), the participant looked 856 to the outside scene 852 for the Number and for the Type menu 858 after activating the menu selection and Next button 860 in keying sequence; however, the Direction entry was activated only 5% of the time following the Type-exit selection by first looking outside. The touch panel operation results 862 list the cluster sets and cluster-times for the menus. The sum of the cluster times for the touch panel is 13.46 s, again well within the 95% CI for the corresponding experimentally derived task times.

Grouping Threshold:

A 3.57 s time threshold separates subtasks that are grouped between flight adjustments from those that are spaced apart according to a discriminate analysis; these latter subtasks include the flight adjustment and the display orientation. Note that the sum of the threshold, flight adjustment, and display orientation times is 5.38 s, which compared to the measured 5.85 s, is within the 95% CI (5.26 s to 6.59 s) for the scene sampling interval. Equivalently, the 95% CI for the grouping threshold is 3.45 s to 4.78 s for modeling purposes.

Modeling Message Composition Time:

As an exemplary application of the micro-modeling of visual attention embodied in the invention, a micro state activity timeline model of the display control methods is used to predict the task execution times and workload for the spot report task. Further, the micro-model is extended to extrapolate the study results to the military design criteria standard for the touch panel display menu button size suitable to the experimental conditions, for comparison of the methods at the same tolerance level.

With the micro-modeling based on the SRK model, the response of the human operator is directed by micro-level activities that occur within cortical-based processors. These processors consist of a perceptual processor, a cognitive processor interfacing to memory, and a motor processor. The processing times are on the order of 70 to 100 milliseconds with a demand loading corresponding to the attention needed to process the information for the task. Furthermore, loading is increased by interference that occurs within processors during performance of concurrent tasks. Here, responses are skilled or rule-based, with skilled responses being a sequence of over-learned, automatic activities performed in a pipelined manner between connected processors, from perceptual, to cognitive, and then to motor action. In contrast, the rule-based reasoning is a cognitive processor activity of an evaluation nature, in particular, of an "if-then" production rule. Furthermore, the operator will perform a large task by separating it into a series of cognitively manageable unit subtasks. In turn, a unit task has an acquisition phase and an execution phase. During acquisition, the operator builds a mental representation of the task while during execution he or she interacts with the machinery to perform the task. The execution phase is described in terms of mental and motor operations that are peculiar to the particular task.

In this study, the spot report task consists of the two time-shared concurrent tasks of flying the vehicle and composing the message. Essentially, the strategy used by the participant to manage these two tasks was to intermittently glance outside the cab at the external scene to adjust the flight and then look inside to operate the menu displays. As described above, the particular distribution of these activities depended upon the display operation method and the associated demands placed upon the visual attention that was needed to perform the message task. In what follows, the micro models activity properties listed in the Tables 1-3 for the unit subtasks of flight adjustment and operating the display buttons, are used to predict the time-lines and loadings for completing message composition with the two methods.

Referring back to Table 1, the table lists the micro-activities for the flight adjustment subtask, along with the cortical processor and corresponding time interval in milliseconds and attention demand loading on a 0-to-7 scale that is required for performance of the activities. The processors are for visual perception, cognition, and motor control including the head, ocular, and manual muscles. The reasoning base for the activity is noted as skilled ("S") or rules ("R"), and the attention loading referenced by a verbal anchor. Finally, the workload experienced in performing the activity is listed; here, the workload is defined as the product of the attention loading and the time interval in seconds. In performing this task, the pilot first raises his head to look outside the cab while at the same time indexing his eyes and accommodating his vision to the distant view. A rapid sequence of several visual perceptions allows him to quickly evaluate his path over the terrain. He estimates the correction to the flight path and then executes the manual changes to the controls in a coordinated movement. A head movement commonly takes about 200 milliseconds, an eye movement followed by visual fixation about 200 ms, while visual perception takes about 100 ms. In his path correction, the pilot selects one of four directions to direct the aircraft making his mental decision according to Hick's law in $150*\log_2(4+1)$ milliseconds or 350 ms. Finally, the motor processor takes about 70 ms. The action is a sequence of over-learned, automatic activities that are performed at the skill level and no acquisition phase is needed for this subtask.

Referring back to Table 2, the table lists the micro-activities for operating the menu buttons with eye-pointing, along with the times and attention demand loading required for performance of the activities. As explained above, the participant would tend to adjust his flight before looking at a menu button with this control method. This is true for the menu information buttons and also for the "next" buttons, although he would probably look at the "send" button directly. In this model, the participant mentally prepares following flight adjustment before starting to operate a menu. The preparation is rule based knowledge recall to set up the menu operation and takes about 1.35 seconds. Following a shift of his vision inside the cab from the outside scene, he looks for the button of interest and activates it. In the vision shift, the participant lowers his head to look inside the cab while at the same time indexing his eyes and accommodating his vision to the near view. Again, the head movement takes about 200 milliseconds, and the eye movement followed by visual fixation about 200 ms. This is followed by a 100 ms visual perception which is needed guide his vision to the button. Activation is initiated by a mental decision to select the direction he should index his eyes. Since he can select one of four directions his mental decision takes 350 ms according to Hick's law. According to the literature, human subjects tend to take three fixations to locate an icon feature, with the first fixation to locate the icon and the remaining fixations to center on the feature. This process is represented by a three fold sequence of eye index, fixation, perception, and decision, with each sequence taking 370 ms. Having centered his vision on the button legend, the participant then holds his view for 1000 ms in a rule-based mode while pressing the selection switch. Note that the mental preparation is executed at the start of the menu and not for the "next" or "send" buttons, and in those cases where the participant selects the "send" button following the "direction" button, he directly executes the activation sequence following the mental decision.

This argument may be carried forward to predict the micro-model message composition times for the spot report task with eye-pointing. Table 5 lists the activities, time in milliseconds, workload, and equivalent loading for each of the display menus as determined by the listings for the micro-activities in Tables 1 and 2. As described above, the participant for the number and type menus first adjusts the flight control, then operates the menu information button, again adjusts the flight control, and finally operates the "next" button to display the next menu. For the direction menu, the participant repeats this process on 18% of the messages, but goes directly to the "send" button from the direction button for the remaining messages. The total message time for the spot report predicted by this micro-state model is 26.420 seconds and the equivalent attention loading across all processors is 5.554 on a scale of 0-to-7. Referring to the statistical results section for eye-pointing, the predicted value is within 1.32% of the 26.846 seconds average spot report time attained by the participants and well within the 95% confidence interval of 20.623 to 33.069 seconds.

Referring to Table 3, the table lists the micro-activities for operating the menu buttons with the touch panel. As explained above, the participant would tend to adjust his flight before starting a menu with this control method and then operate both buttons in succession. As before, the participant mentally prepares following flight adjustment before starting to operate a menu. Following a shift of his vision inside the cab from the outside scene, he looks for the button of interest and activates it. In the vision shift, the participant lowers his head to look inside the cab while at the same time both indexing his eyes and accommodating his vision to the near view, while moving his hand to the display. The participant move his hand the 27-inch distance from the manual control to the side of the 7.8-inch diagonal display so as not to block the view, in a time equal to $118*\log_2(27.0/7.8+0.5)=212$ ms, according to Welford's Version of Fitt's law. This is followed by a 100 ms visual perception that is needed guide his hand to the button. Activation is initiated by a mental decision to select the direction he should index his hand. Since he can select one of four directions his mental decision takes 350 ms according to Hick's law. The participant shifts his eyes to visually fix on the button; this is followed by visual perception and a decision confirming the choice. He then moves his hand to the button and placing his finger on the surface, presses the button to make his selection. The hand movement from the side of the 5-inch wide display to the center of the 2-inch wide button is completed in a time equal to $118*\log_2(5.0/2.0+0.5)=187$ ms, according to Welford's Version of Fitt's law. In those cases where the participant selects the direction button following the "next" button of the type menu, he directly executes the activation sequence following the mental decision for hand movement.

This argument may be carried forward to predict the micro-model message composition times for the spot report task with the touch-panel. Table 6 lists the activities, time in milliseconds, workload, and equivalent loading for each of the display menus as determined by the listings for the micro-activities in Tables 1 and 3. As described above, the participant for the number and type menus first adjusts the flight control then operates in succession the menu information button and the "next" button. For the direction menu, the participant repeats this process on 11% of the messages, but goes directly to the menu from the "next" button of the type menu for the remaining messages. The total message time for the spot report predicted by this micro-state model is 12.620 seconds and the equivalent attention loading across all processors is 6.105 on a scale of 0-to-7. Referring to the statistical results section for the touch panel, the predicted value is practically equal to the 12.905 seconds average spot report time attained by the participants (within 0.03%), and well within the 95% confidence interval of 8.124 to 17.686 seconds.

In summary, the predicted spot report message times using the micro-state activity models are very close to the experimental averages. The prediction error for the eye-pointing method is 1.32%, while that for the touch panel is 0.03%. The close agreement between the predicted and actual message times suggest that the micro-state activity model closely represents the actual mechanics of the process. Note that the model does not predict the cognitive processes such as the message error rate or the decision of when to adjust flight between message menus. Instead, the frequency data on visual shifts between the outside scene and the cab during the spot report was used to represent the decision making process in the model. However, the model may be used to estimate the time period that the participant was willing to ignore flight control based on his prediction of his flight dynamics for the specified speed and altitude above ground. The model predicts that the participant would tend to shift flight control every 3.86 seconds with the touch panel at least for the first two menus, since this is the time to select both buttons on one menu. Furthermore, the participant hesitated to extend this time to 4.97 seconds by selecting a button from the next menu, possibly because of the additional need for mental preparation. Equivalently, the model predicts that the participant was willing to wait 4.11 seconds before shifting to flight control with eye-pointing at least for the first two menus, since this is the time to select the information button on one menu. However, he was not willing to extend that time to 6.57 seconds which is the time needed to operate both buttons on one menu. For these reasons, it appears that the participant needed to redirect flight control about roughly every 4-seconds at least for the first two menus. However, the participant was willing to extend this time as he neared the end to complete the message task.

Extrapolating the Touch Panel Control to the Design Criteria Standard:

Essential to the invention is the demonstration that the micro-model of visual attention may be used to predict the effect of button size upon the performance of the touch panel. The study was conducted with a 2-inch by 2-inch button for both methods, the tolerance needed to operate with the eye-tracker. A ½-inch by ½-inch button size is recommended for operating a touch panel in a stationary position without gloves, according to the Department of Defense Design Criteria Standard, Mil Std 1472-F (1999). The ½-inch square size may be at the tolerance for operating touch panels, and the fact that the experimental button size was 16-times larger than would normally be used in practice may have contributed to the faster operation. With the use of the smaller button size, the participant would increase the number of eye fixations to ensure the location of the button while slowing his hand movement during the activate button stage. This action will increase the menu button subtask time thereby forcing a change in method strategy equivalent to that used with eye-pointing and resulting in a longer task time.

The adjustments to the micro-model of the menu button subtask are as follows. Once having located the button, the participant would need to index his eyes for a refined fixation and evaluation taking 370 ms to complete. As before, he would then move his hand to the button from the side of the panel; however, since the button is smaller, the movement time is now equal to $118*\log_2(5.0/0.5+0.5)=402$ ms, according to Welford's Version of Fitt's law. Concurrent with this movement is another eye index and fixation to ensure that the hand contacts the correct end point. In this way, the time for the activate button phase of the touch panel micro-activities model would be increased by 585 ms to 1692 ms by the use of the smaller button size. Further, the time to select the menu information button from the outside scene is increased to 3342 ms. In following the flight control strategy used before with the touch panel, the participant would now adjust his flight path every 5034 ms; however, as mentioned above, this may be longer than the participant would want and he would be forced to apply the flight control strategy used with eye-pointing.

This argument is extended to predict the micro-model message composition times for the touch panel method with the ½-inch by ½-inch buttons, as follows. As described in the sections above for the eye-tracker flight control strategy, the participant for the number and type menus first adjusts the flight control, then operates the menu information button, again adjusts the flight control, and finally operates the "next" button to display the next menu. For the direction menu, the participant repeats this process on 18% of the messages, but goes directly to the "send" button from the direction button for the remaining messages. The total message time for the spot report predicted by this micro-state model is 22.594 seconds and the equivalent attention loading across all processors is 6.988 on a scale of 0-to-7. This message time is compatible with the predicted eye-pointing value of 26.420 seconds; the difference of 637.7 ms per button is partly due to the 900 ms used by the participant to hold his gaze on the button with eye-pointing to ensure coordination with the selection switch. In summary, for button sizes within the tolerance range, both eye-pointing and the touch panel would result in compatible operations.

Successful Control Strategies for Methods:

In this demonstration study, the participants successfully performed together the dual tasks of the self-paced spot-report by eye-pointing and the forced-paced vehicle navigation by adjusting their control strategies with however, a need to relax the restrictions on their flight performance. The differences by method in the altitude variation, collective power variation, altitude stability control gain and remnant, and the task times for the spot report, are a result of the differences in visual attention and hand control strategies used for operating the display menu buttons. The visual attention strategies result from the different tolerances afforded by the button size for the two methods; the hand control strategies results from the conflicting needs for hand location. While the larger tolerance needed for eye-pointing forced the operator to pace out the visual attention between navigation and display control thereby increasing the task time, the ability to maintain hand control resulted in better altitude control. The tighter tolerance possible with the touch panel allowed the button control actions to be grouped, but the need to remove a hand from the flight controls reduces altitude stability. These strategies are made up of subtask cluster groupings as determined by a switching threshold that is set by the sampling period required for vehicle navigation, a process needed for flight adjustment that occurred at a fixed rate. The cab visual efforts for the instrument review and display operation are fitted between these visual samples of the external scene. According to one embodiment of the invention, the micro-model of visual attention may be used to both predict the study results and extrapolate to display formats for the control methods.

On this basis with the operator performance predicted by the micro model of visual attention as a further exemplary embodiment for display control, the invention has application in dual-control tasks as an electronic aider that schedules control strategy for control of displays by eye-pointing (i.e., the use of eyes as a pointing device to control displays by tracking visual gaze fixations) and alters the display format for optimal display-control compatibility, based on the eye movements of an operator, a micro-model of visual attention and associated workload, and a cost/benefit calculation of the effect on the system performance.

Figure 9A:
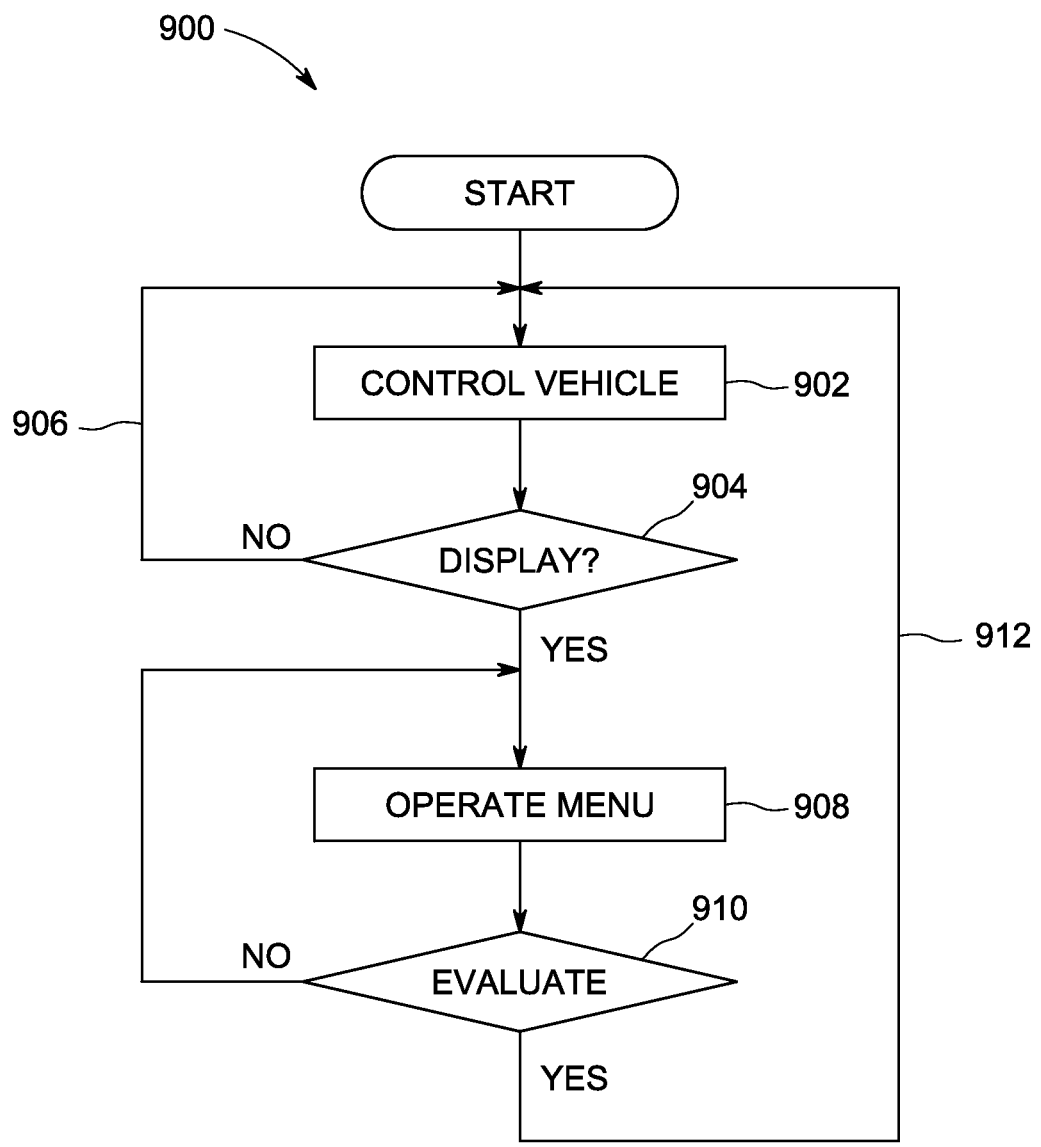
FIG. 9A is a flow chart of control procedure for dual tasks during vehicle control.

FIG. 9A is a flowchart showing the sequence of operations that may be used in the dual-control tasks 900 with the operator controlling the passage of the vehicle while periodically operating a display menu. As mentioned, the vehicle control 902 is a sequence of over-learned, automatic activities that are performed at the skill level and no acquisition phase is needed for this task. At intervals, the operator has a need to operate the display 904 while controlling the vehicle 902. In this case, the task consists of the two time-shared concurrent sub tasks of controlling the vehicle and operating the display. A reasonable strategy used by the operator to manage these two tasks is to intermittently glance at the external scene to adjust the course and then look at the inside view to operate the menu displays 908. Depending upon the vehicle control dynamics, the operator periodically interrupts the display operation to evaluate vehicle passage 910 and returns to vehicle control 912 to correct any offset in passage before returning to the display if needed, else keeps operating the display 914. At high task loads, the schedule of these activities is essential for mission success and a functional schedule is determined by the demands placed upon the visual attention by the vehicle passage dynamics, and by the display operation method and associated display format. For example, a task schedule in which the operator devotes full attention to the menu operation under rapidly changing passage dynamics can result in loss of vehicle control.

Figure 9B:
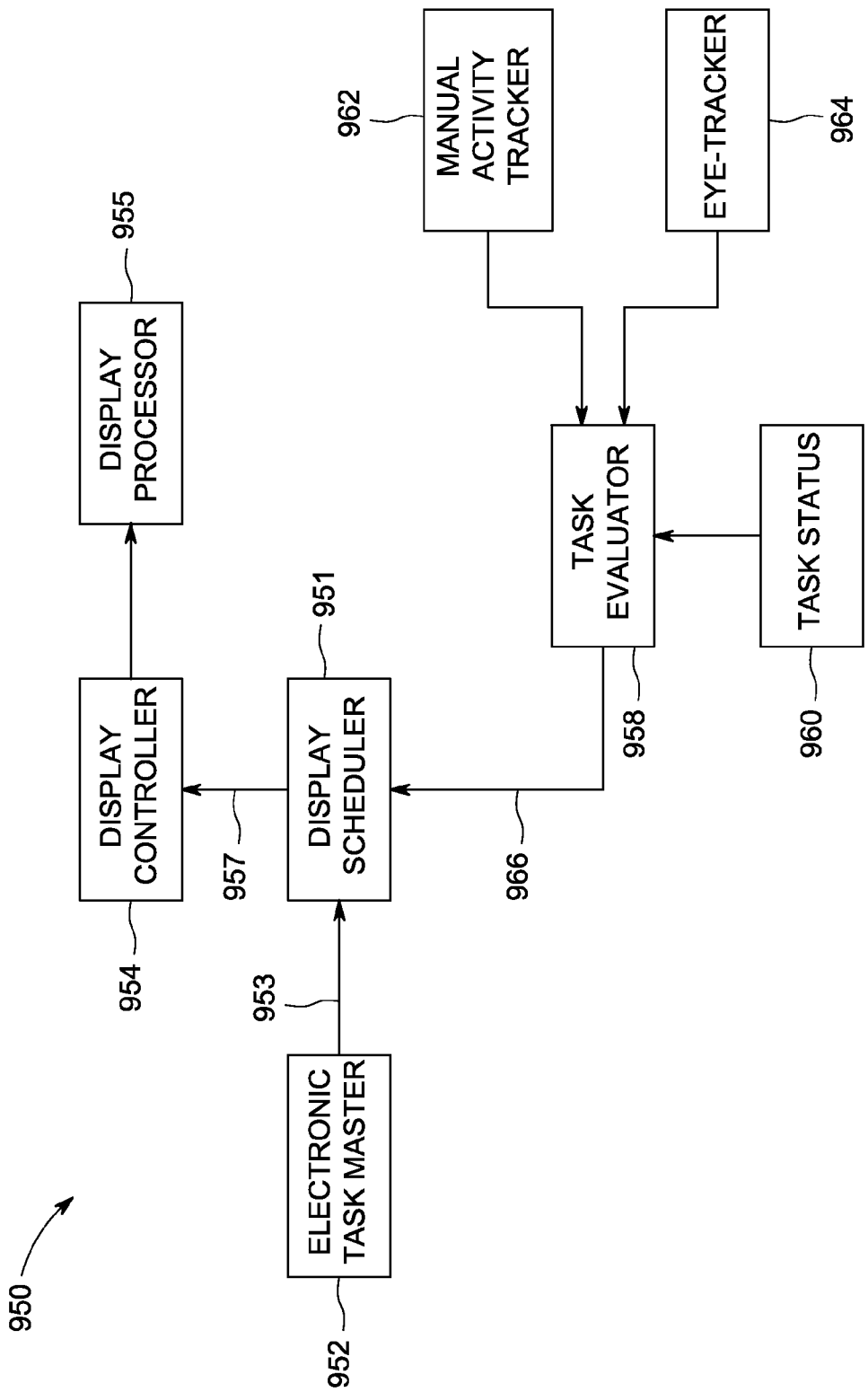
FIG. 9B is a schematic of a video display scheduling architecture containing an electronic display scheduler with input from an electronic task master and a task evaluator, and output to a display processor via a display controller in accordance with exemplary embodiments of the present invention.

FIG. 9B is a schematic of an embodiment for such a dual-control task scheduling architecture containing an electronic display scheduler 950 with input from an electronic task master 952 and a task evaluator 958, and output to a display processor 955 via a display controller 954 in accordance with exemplary embodiments of the present invention. The task evaluator 958 has input from a manual activity tracker 962, eye-tracker 964, and task status 960. The electronic task master 952 with knowledge of tasks to be performed outputs a scheduling strategy 953 of task sharing and preferred alternative control based on a cost/benefit analysis of vehicle dynamics, route, terrain and operational environment. The task evaluator 958 outputs the task activity status 966 to the display scheduler 950 and on the basis of the scheduling strategy and task activity, the scheduler outputs menu formats 957 and the treeing order that the formats will be presented between the intermittent course corrections as shown in FIGS. 7B and 7C. While in this embodiment, the task master 952 dictates the scheduling strategy, in a further embodiment, the operator 701 from FIG. 7A may have the final choice of selecting the strategy and alternative controller either explicitly through switch or voice action at the display setup, or implicitly from control actions; for example, an inability to control by eye-pointing without errors may feedback to the scheduler as a need for a change in display format.

FIG. 10 is an illustration 1000 of the dual-task control strategy time line in accordance with exemplary embodiments of the present invention. In FIG. 10, the dual-task control strategy time line 1012 originates with the electronic task master 902 in a pattern of intermittent vehicle passage control periods of time 1014, $t_F$, repeated at intervals spaced between a series of menu control windows of time duration 1014, $t_w$. Given that there are N such windows, the total menu operation from start to completion is $T=N*t_w+(N-1)$

*$t_F$, where upon vehicle passage control continues. The menu control window is shown as a series of discrete control steps consisting of a setup time 1016, $\tau_S$, followed by a set of control element acquisition and activation times 1018, $\tau_A$. The window may be filled with a series of such steps depending upon the menu format design. As well as strategy and control device, the task master 902 directs the menu to be operated. In turn, the display scheduler 900 designs the menu format and treeing resulting in the number of windows N, and the form of the series of control steps $\{[\tau_S, \tau_A, \ldots, \tau_A]\}$.

Figure 11A:
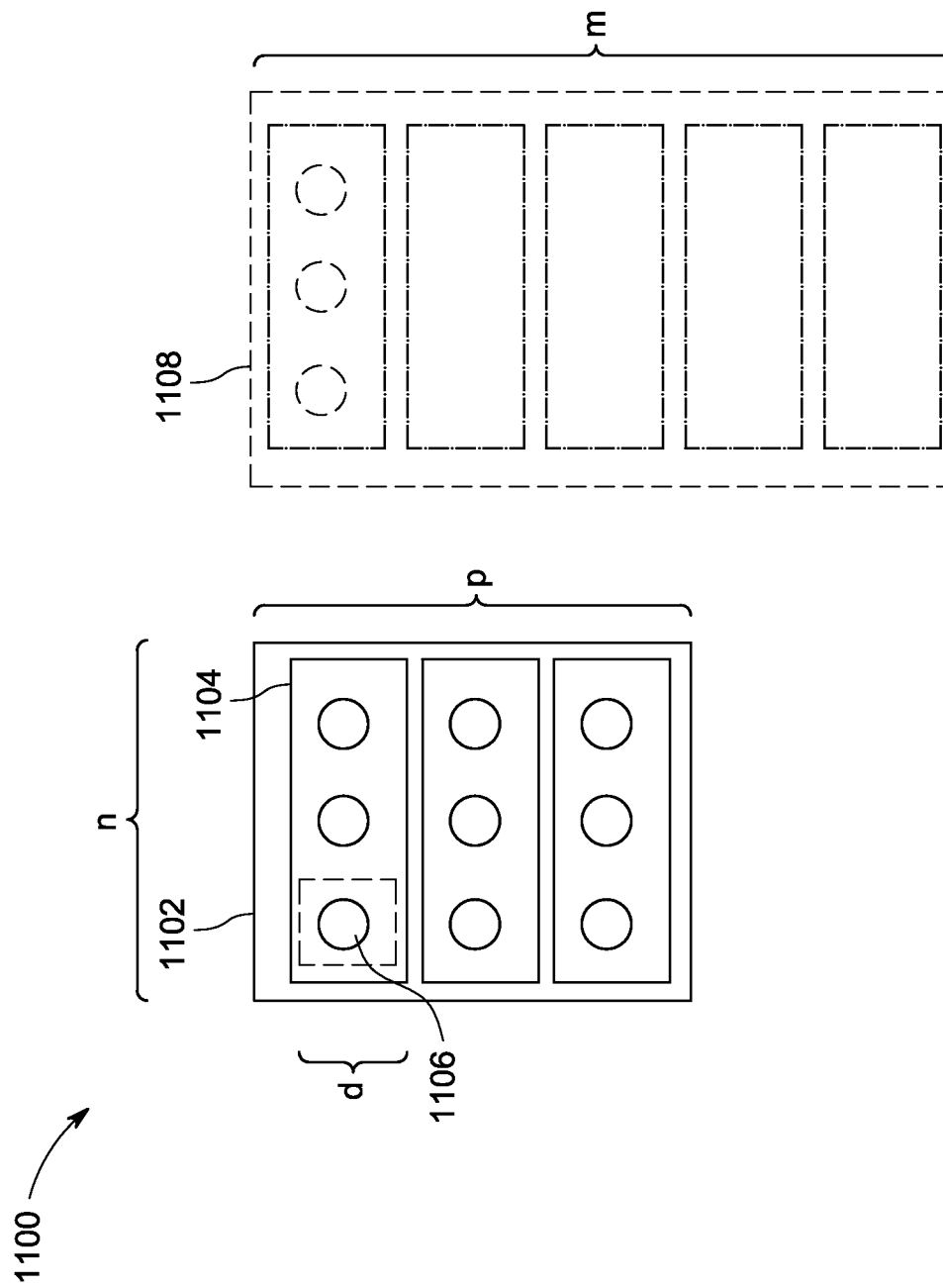
FIG. 11A is a schematic of an embodiment of menu format design parameters in accordance with exemplary embodiments of the present invention.

FIG. 11A is a schematic of an embodiment of menu format design parameters in accordance with exemplary embodiments of the present invention. The menu parameters show the display 1100 of size n by p, with $n_f$ fields of selection choices, where each field 1102 contains as array of $n_c$ selection elements 1104 of size d, a size required to operate with the alternative control device; the total elements displayed are $n_d = n_f * n_c$. In this scheme, the operator selects an element from the array choices for a field, and then proceeds to the next field until all fields have been processed. For demonstration, assume that the menu consists of selection elements distributed in rows and columns. Let the full menu 1106 processed be of size m by p, by assumption larger than the display, and with $n_m$ number of elements to be processed, the depth of the menu is $m = n_m * d^2/p$; and the total fields are $n_{fo} = n_m/n_c$.

Window time allowed is an upper limit to the display processing time $t_d$, given by the sum of the times for setup and the selection acquisitions: $t_w > t_d = \tau_S + n_f * \tau_A$, where $n_f$ is the number of fields processed. In terms of modeling an operator's cognition, the display setup time is the time for the operator to initially orient on the display, $\tau_o$, and the acquisition times are the sum of the times to recall the properties of a field, $\tau_r$, to review the field choices, $\tau_v$, and to decide and activate the selection for the field, $\tau_c$; in this simple demonstration: $t_d = \tau_o + n_f * (\tau_r + n_c * \tau_v + \tau_c)$. The number of fields in the menu display may be estimated as: $n_f = (t_w - \tau_o)/(\tau_r + n_c * \tau_v + \tau_c)$; the number of menu display windows is given by the ratio of the menu fields to the display fields rounded up, $N = \text{ceil}(n_{fo}/n_f)$, a function of the number of choices in a field $n_c$, the allowable window time, and the micro-modeling times. In practice, the actual design problem may be more complicated. For example, fields may have different number of choices, display layout restrictions may apply such that field choices should be have spatial continuity and perhaps clustered together in a compact arrangement for ease of processing, and operator selections may lead to further treeing with more field options added to the menu.

Figure 11B:
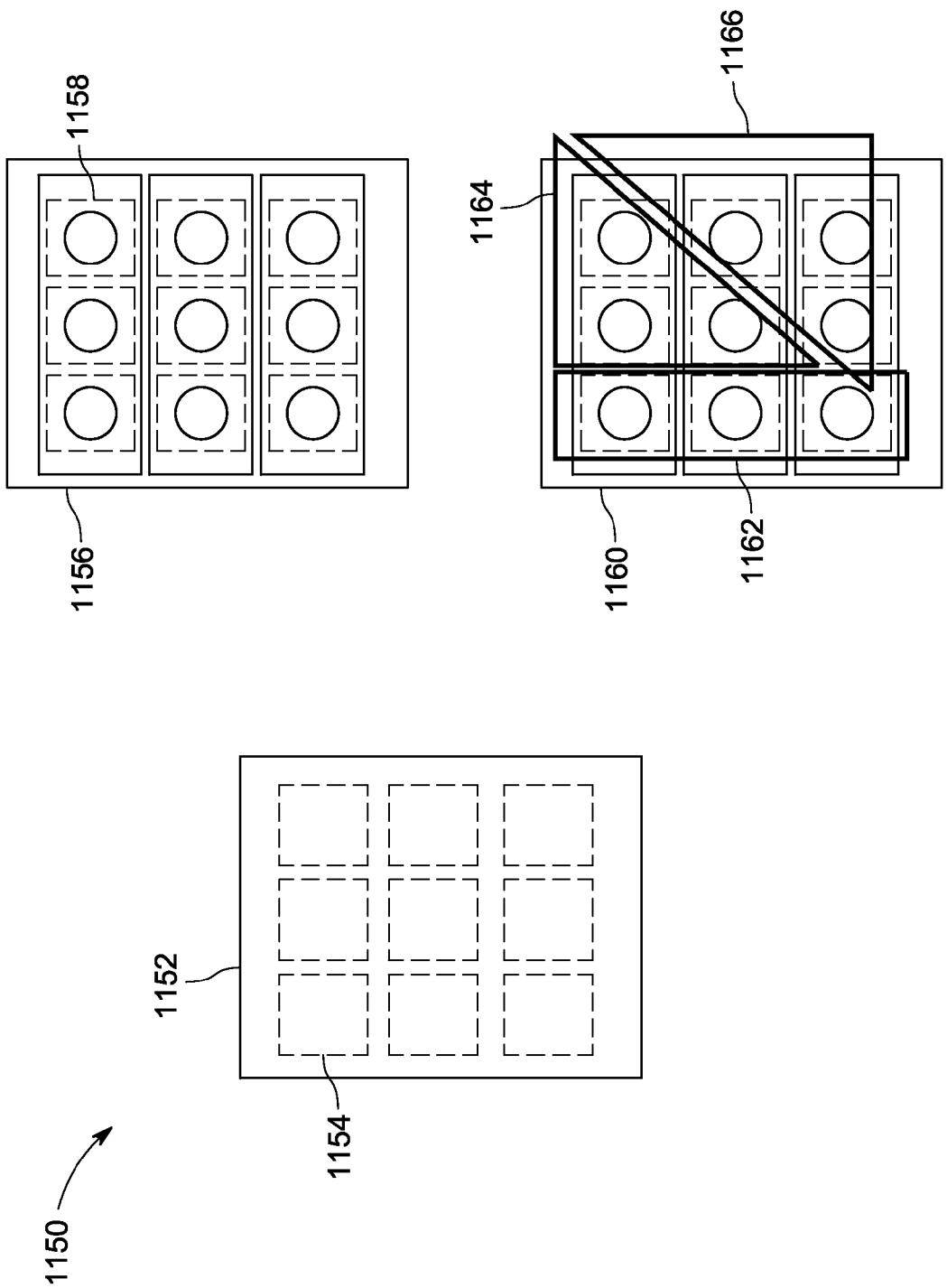
FIG. 11B is a schematic of another embodiment of menu format design parameters in accordance with exemplary embodiments of the present invention.

According to one embodiment, the design process of the display scheduler 900 may use an iterative optimization routine based on minimizing a cost function defined in terms of the number of windows and the workload of the operator, $J = C0*N + C1*\Sigma(w - wo)2$, where the summation is over the N windows and intermittent vehicle passage control periods, C0 and C1 are cost weight factors, and the reference workload, "wo", corresponds to a state of optimal performance according to the Yerkes-Dodson Law. Excessive workload may lead to operator errors which causes the addition of more fields to the design process. Implicit in the cost function is the effect of the display menu layout through the time needed by the operator to review the field choices, since this time includes search, locate, and recognition of choices before a decision to activate may be made; associated with these time elements are effects on workload as well. In a further embodiment, using a master display layout defined by the activation resolution size, the scheduler may iteratively assign fields and choices to the layout for all windows until all combinations have been made, and then select the assignment corresponding to the minimal cost. FIG. 11B shows an example 1150 of such an application with a master display layout 1152 defined by a resolution cell 1154 for set of three fields each with three choice elements fitted in one iteration according to layout 1156 with fields arranged in horizontal rows 1158 and in another iteration according to layout 1160 with fields in a vertical column 1162 and two close clustered triangular patterns 1164 and 1166**. As well as the iterative optimization routine, in further embodiments, variations of minimum cost scheduling algorithms such as the linear programming simplex method, the dynamic programming based Held-Korp algorithm, the Lin-Kernighan heuristic (as a "traveling salesman" problem), or critical path job-machine scheduling techniques may be applied to solve the display assignment as a standard combinational optimization problem.

Figure 12:
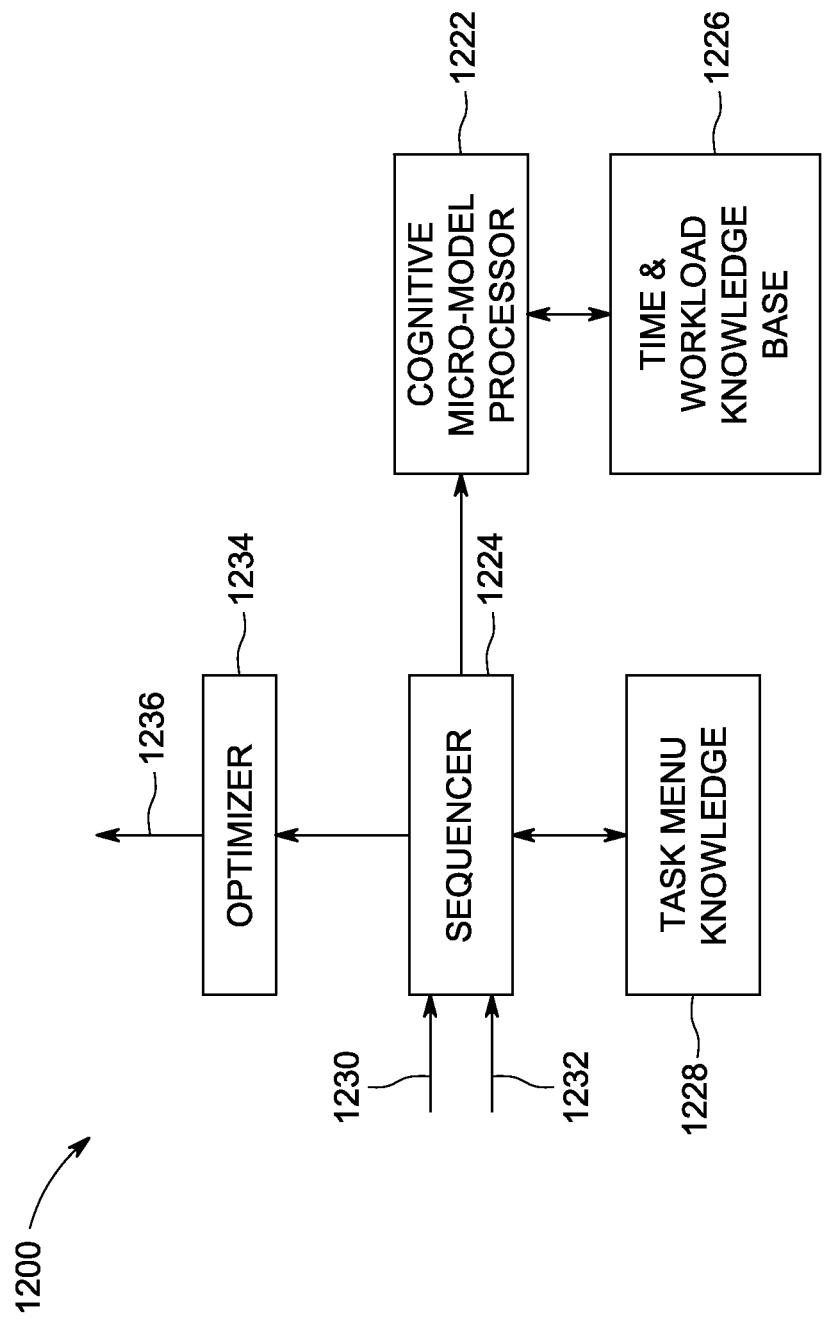
FIG. 12 is a functional block diagram of the display scheduler of FIG. 9B configured in accordance with exemplary embodiments of the present invention.

FIG. 12 is a functional block diagram of the display scheduler 950 of FIG. 9B configured 1200 in accordance with exemplary embodiments of the present invention. The scheduler 950 is composed of sequencer 1224 with input of the task strategy 1230 from the task master 952 of FIG. 9B (with output 953), of input 1232 from the task evaluator 958 of FIG. 9B (with output 966), and output to an optimizer 1234. The sequencer 1224 has access to task menu knowledge base 1228, and to micro-model processor 1222, itself with access to a knowledge base 1226 on micro-model times and workload. Based on the task strategy and task status, the sequencer using the task knowledge base 1226 and the model processor 1222, executes an iterative display scheduling process for all menu combinations, with associated cost variables. The optimizer computing the corresponding cost functions, selects the minimal cost schedule and outputs 1234 the same to the display controller 954 of FIG. 9B (with input 957).

Figure 13C:
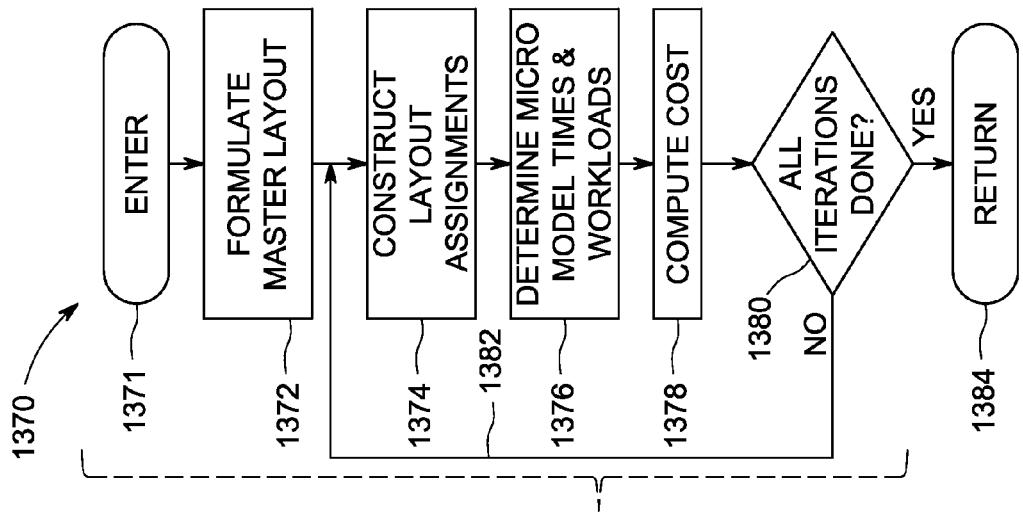
FIG. 13C is a flow chart of a subroutine for computing the costs of window layouts for the scheduling process.
Figure 13B:
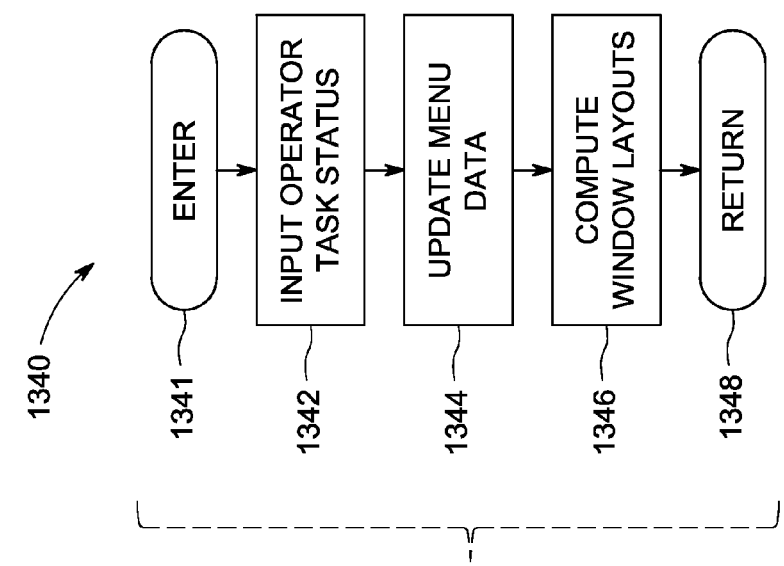
FIG. 13B is a flow chart of a subroutine for the determining window layouts for the scheduling process.
Figure 13A:
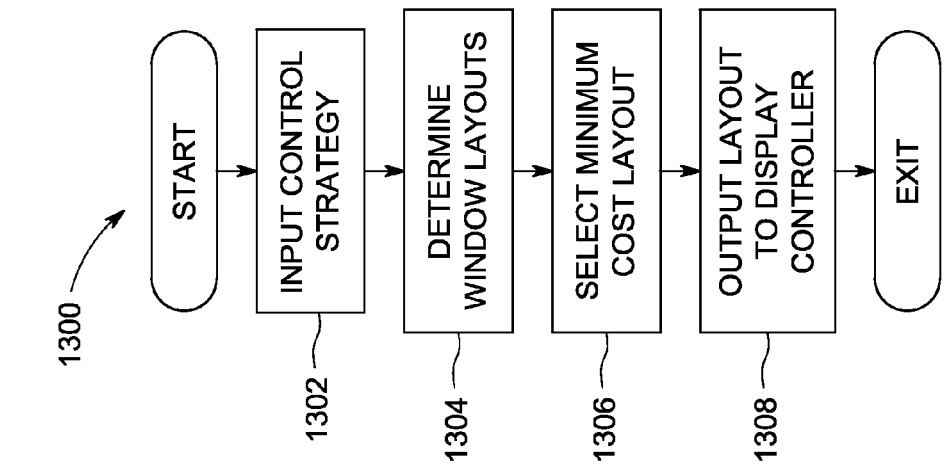
FIG. 13A is a flow chart of the display scheduling process for the scheduler of FIG. 9B.

FIGS. 13A, 13B and 13C are a set of flow charts for an embodiment of the display scheduling process executed by the scheduler. In FIG. 13A, the sequencer inputs the control strategy 1302 and determines the set of applicable window layouts 1304; the optimizer selects the minimal cost window layout 1306 and outputs the results to the display controller 1308. FIG. 13B shows the routine 1304 for the window layout set following subroutine call 1341 consisting of reading as input the operator task status 1342, updating the window menu data 1344, and computing the window layouts 1346 before routine return 1348; FIG. 13C shows the routine 1346 for computing the window set following subroutine call 1371 consisting of formatting the menu master layout 1372, then repeatedly 1382 constructing layout assignments 1374, determining the micro-model times and workloads 1376, and computing the cost 1378 for all possible menu combinations 1380, before routine return 1384.

In a further embodiment, the movement tracker 102 (FIG. 1) may collect attributes of the cognitive state of the operator, in particular, attributes pertaining to the present state of task attention to provides a starting point for the display control tasking. For example, the operator may have already recalled the task schema and features to be processed and starting the task analysis at that point may be imposing a hindrance instead of aiding by interfering with the natural task flow. In one embodiment, attributes may comprise one or more such as vision attributes of eye-movements, fixations, and eye-blinks; physiological attributes of heart-rate, heart rate variability, respiration rate, and autonomic cardiac activities of the respiratory sinus arrhythmia, all measured from analyses of the electrocardiogram; and physiological attributes of single-trial evoked response potential and short term frequency power spectra from analysis of electroencephalogram measurements of cortical brain activity. These attributes may be mapped to the state of cognition reasoning as "Skills" (natural processing), "Rules" (rules processing), "Knowledge" (knowledge based reasoning), and "Executive" (task switching and setup). In turn, this may be mapped to the state of task attention further comprising at least one of the states of confounded, task orienting, task recall, task focus, and task execution with option review and decision, and selection activation.

In an embodiment considering vision attributes, eye-blinks and eye-movement and fixation patterns may indicate the state and source of visual attention. In vehicle control with vision directed to the scene display, the visual patterns may be pursuit tracking of objects in the scene as the vehicle moves forward such as visual tracking of the road edge associated with "Skill" level driving, with occasional transient saccades to acquire new road objects that are associated with "Rules" based processing of search activity. This activity is commonly associated with a cluster of fixations once an object has been located that are used to first recognize a feature of the object for identification, and then a longer fixation for identifying the object, followed by a flurry of eye-blinks during evaluation. As has been mentioned, a shift in fixation from the scene display to the vehicle menu display may be preceded by a fixed gaze while task preparation is mentally made, presumably by priming short term memory to task schema based rules and knowledge in long term memory store. In turn, the shift may be followed by a search pattern for pertinent features of the display to complete task setup (by mapping object stimuli to schema feature framework), and finally during task execution, a disciplined pattern of fixations clustered on task pertinent features with longer fixations made in selection, and possibly eye blink flurries during a resulting manual action.

In a further embodiment, the general state of attention may be determined from electrocardiogram (EKG) measurements (not shown) since the heart rate and its variability are sensitive to the cognitive workload with an increase in heart rate and a reduction in variability with increased task demands; in particular, the power spectrum of the middle frequency component (0.1 Hz) is reduced during resource limited tasks.

In a still further embodiment, the state of cognition may be determined from electroencephalogram (EEG) measurements from skin-scalp sites (not shown) of cortical brain activity; the scalp topological and power spectrum frequency distributions of the Electroencephalography (EEG), are related to cognitive processing. In particular, scalp topology spectra distributions associated with cognitive states are:

Task switching and recall—Strong coherence occurs in the Theta band (4-7 Hz) for the prefrontal and posterior cortical regions during task setup and recall with associated memory transfer for cognitive switching between tasks; this is followed by suppression of the upper alpha band (10-12 Hz) with memory processing at completion of task setup.

Knowledge based reasoning—Frontal theta (4-7 Hz) activity occurs with increased mental processing during challenging tasks involving "rules" processing of knowledge; prefrontal excitation and lateralization in the anterior regions are indicative of high mental workload that is associated with "rules" and "knowledge" based reasoning.

Rules processing—Alpha band (8-12 Hz) power decreases with task performance, at least for arithmetic, recalling, and visual and auditory memory tasks, while there is increased theta band (4-7 Hz) power during spatial and verbal tasks, with a large increase over the right hemisphere in the spatial task.

Repetitive skills task—A repetitive task sequence is associated with suppressed lower alpha band (8-10 Hz) involved in attention and expectancy.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

TABLE 1

Micro-activities for flight adjustment during display operations

| | | | Cortical | | Effector | | | | | |
|---|---|---|---|---|---|---|---|---|---|---|
| Activity | millisec | base | parietal | frontal | ocular | head | manual | loading | verbal anchor | workload |
| Look outside | 200 | Skill | | | | ○ | | 5.8 | discrete adjustment | 1.16 |
| Index eyes | [200] | Skill | | | ○ | | | 5.8 | discrete adjustment | 1.16 |
| Glimpse | 100 | Skill | ○ | | | | | 5.0 | locate | 0.50 |
| Index eyes | 200 | Skill | | | ○ | | | 5.8 | discrete adjustment | 1.16 |
| Glimpse | 100 | Skill | ○ | | | | | 5.0 | locate | 0.50 |
| Index eyes | 200 | Skill | | | ○ | | | 5.8 | discrete adjustment | 1.16 |
| Glimpse | 100 | Skill | ○ | | | | | 5.4 | locate | 0.54 |
| Estimate path | 350 | Skill | | ○ | | | | 6.8 | judgment (aspect) | 2.38 |
| Adjust controls | 70 | Skill | | | | | ○ | 5.8 | discrete adjustment | 0.41 |
| Total | 1320 | | | | | | | | | 8.96 |

Note:
Concurrent times are in brackets

TABLE 2

Micro-activities of eye-pointing display operation

| Activity | millisec | base | Cortical | | Effector | | | loading | verbal anchor | workload |
|---|---|---|---|---|---|---|---|---|---|---|
| | | | parietal | frontal | ocular | head | manual | | | |
| Mental prep | 1350 | Know | | ○ | | | | 5.3 | recall knowledge | 7.16 |
| Look inside | 200 | Skill | | | | ○ | | 5.8 | discrete adjustment | 1.16 |
| Index eyes | [200] | Skill | | | ○ | | | 5.8 | discrete adjustment | 1.16 |
| Glimpse | 100 | Skill | ○ | | | | | 5.0 | locate | 0.50 |
| Decision | 350 | Rule | | ○ | | | | 6.8 | judgment | 2.38 |
| Index eyes | 200 | Skill | | | ○ | | | 5.8 | discrete adjustment | 1.16 |
| Glimpse | 100 | Skill | ○ | | | | | 5.0 | locate | 0.50 |
| Decision | 70 | Rule | | ○ | | | | 6.8 | judgment | 0.48 |
| Index eyes | 200 | Skill | | | ○ | | | 5.8 | discrete adjustment | 1.16 |
| Glimpse | 100 | Skill | ○ | | | | | 5.0 | locate | 0.50 |
| Decision | 70 | Rule | | ○ | | | | 6.8 | judgment | 0.48 |
| Index eyes | 200 | Skill | | | ○ | | | 5.8 | discrete adjustment | 1.16 |
| Glimpse | 100 | Skill | ○ | | | | | 5.0 | locate | 0.50 |
| Decision | 70 | Rule | | ○ | | | | 6.8 | judgment | 0.48 |
| Hold gaze | 1000 | Rule | | | ○ | ○ | | 2.2 | discrete actuation | 2.20 |
| Push switch | [200] | Rule | | | | | ○ | 2.2 | discrete actuation | 0.44 |
| total | 2460 | | | | | | | | | 11.43 |

Note:
Concurrent times are in brackets

TABLE 3

Micro-activities of touch panel display operation

| Activity | millisec | base | Cortical | | Effector | | | loading | verbal anchor | workload |
|---|---|---|---|---|---|---|---|---|---|---|
| | | | parietal | frontal | ocular | head | manual | | | |
| Mental prep | 1350 | Know | | ○ | | | | 5.3 | recall knowledge | 7.16 |
| Look inside | 200 | Skill | | | | ○ | | 5.8 | discrete adjustment | 1.16 |
| Index eyes | [200] | Skill | | | ○ | | | 5.8 | discrete adjustment | 1.16 |
| Move hand | [212] | Skill | | | | | ○ | 5.8 | discrete activation | 1.23 |
| Glimpse | 100 | Skill | ○ | | | | | 5.0 | locate | 0.50 |
| Decision | 350 | Rule | | ○ | | | | 6.8 | judgment | 2.38 |
| Index eyes | 200 | Skill | | | ○ | | | 5.8 | discrete adjustment | 1.16 |
| Glimpse | 100 | Skill | ○ | | | | | 5.0 | locate | 0.50 |
| Decision | 70 | Rule | | ○ | | | | 6.8 | judgment | 0.48 |
| Place finger | 187 | Rule | ○ | | | | ○ | 5.8 | discrete adjustment | 1.08 |
| Push button | 200 | Skill | | | | | ○ | 2.2 | discrete actuation | 0.44 |
| Total | 1107 | | | | | | | | | 6.04 |

Note:
Concurrent times are in brackets

TABLE 4

Mean (SE) for eye shift measures

| METHOD | FLIGHT-PHASE | NUMBER |
|---|---|---|
| EYE-POINTING | DEPARTURE | 7.867 (0.536) |
| | SPOT REPORT | 4.883 (0.532) |
| | BASELINE | 5.017 (0.532) |
| TOUCH-PANEL | DEPARTURE | 8.887 (0.556) |
| | SPOT REPORT | 2.051 (0.542) |
| | BASELINE | 5.263 (0.558) |

TABLE 5

Estimated spot report task times for eye-pointing

| Menu Button | Subtask Model Elements | | | | | | Subtotal |
|---|---|---|---|---|---|---|---|
| | Flight Adjustment | | Display Activity | | | | |
| | Evaluate | Controls | Recall | Orient | Select | Activate | |
| Select report | | ○ | ○ | ○ | ○ | ○ | 4230 |
| Number | ○ | | ○ | ○ | ○ | ○ | 4660 |

TABLE 5-continued

Estimated spot report task times for eye-pointing

| | Subtask Model Elements | | | | | | |
|---|---|---|---|---|---|---|---|
| | Flight Adjustment | | Display Activity | | | | |
| Menu Button | Evaluate | Controls | Recall | Orient | Select | Activate | Subtotal |
| Exit-1 | ○ | | ○ | ○ | ○ | ○ | 4660 |
| Type | ○ | ○ | ○ | ○ | ○ | ○ | 5810 |
| Exit-2 | ○ | | ○ | ○ | ○ | ○ | 4460 |
| Direction (88%) | ○ | | ○ | ○ | ○ | ○ | 0.88*4660 |
| Direction (12%) | | | ○ | | ○ | ○ | 0.12*4000 |
| Send | | | | | ○ | ○ | 2450 |
| Total | | | | | | | 26420 |

TABLE 6

Estimated spot report task times for touch-panel

| | Subtask Model Elements | | | | | | |
|---|---|---|---|---|---|---|---|
| | Flight Adjustment | | Display Activity | | | | |
| Menu Button | Evaluate | Controls | Recall | Orient | Select | Activate | Subtotal |
| Select report | | | ○ | ○ | ○ | ○ | 2837 |
| Number | ○ | | ○ | ○ | ○ | ○ | 3247 |
| Exit-1 | | | | | | ○ | 787 |
| Type | ○ | ○ | ○ | ○ | ○ | ○ | 4397 |
| Exit-2 | | | | | | ○ | 787 |
| Direction (05%) | ○ | | ○ | ○ | ○ | ○ | 0.05*3247 |
| Direction (95%) | | | ○ | | ○ | ○ | 0.95*2587 |
| Send | | | | | | ○ | 787 |
| Total | | | | | | | 12620 |

REFERENCE NUMERALS

ARL 10-30

100 visual attention modeler
102 movement tracker
104 visual attention estimator
106 workload estimator
107 adaptive aider
108 operator
110 machine
112 panel display
113 display menu
114 external scene display
115 hand
116 vehicle controller
117 eye-gaze
120 sensors
200 computer system
202 processor
204 memory
205 visual attention modeler
206 support circuits
208 I/O Interface
209 I/O Devices
220 movement tracker module
222 workload estimator module
224 visual attention estimator module
226 adaptive aider module
250 operating system
300 method
302 step
304 step
306 step
308 step
312 step
314 step
316 step
400 method
402 step
404 step
406 step
408 step
410 step
412 step
500 information processing model
510 Executor
520 model bases
530 knowledge
540 rules
545 download
550 skills processor
560 task status
570 input
580 activator
610 vehicles
611 continues
613 display
614 display menu
617 returning
620 task recall
622 outside scene
624 index eyes
626 glimpse

REFERENCE NUMERALS

ARL 10-30

628 evaluate
630 features
634 path
636 vehicle controls
640 task
642 display
644 index eyes
646 glimpse
648 evaluations
650 choice
652 sequence
654 holding gaze
656 activation switch
660 task
662 display
664 index eyes
665 hand
666 index eyes
668 glimpse
670 evaluation
672 choice
676 place
678 finger
700 cab
701 operator
702 tracker
703 sensors
706 panel display
708 projection screen
710 projections system
712 video multiplexer
714 GT110 terrain imaging system
716 Silicon Graphics Computer
718 computer system
720 two-way switch box
721 MicroVAX
722 computer system
730 menu
732 element
734 format
736 format
800 operations
802 outside scene
808 menus
810 button action
812 operation results
850 panel operations
852 outside scene
858 Type menu
860 Next button
862 touch panel operation results
900 control tasks
902 vehicle control
904 display
908 menu displays
910 evaluate vehicle passage
912 vehicle control
914 display
950 display scheduler
952 task master

REFERENCE NUMERALS

ARL 10-30

953 scheduling strategy
954 display controller
957 menu formats
958 task evaluator
960 task status
962 activity tracker
964 eye-tracker
966 task activity status
1000 illustration
1012 strategy time line
1014 periods of time
1016 setup time
1018 activation times
1100 display
1102 field
1104 elements
1106 menu
1150 example
1152 display layout
1154 resolution cell
1156 layout
1158 horizontal rows
1160 layout
1162 vertical column
1164 triangular patterns
1166 triangular patterns
1200 configuration
1222 micro-model processor
1224 sequencer
1226 time and workload knowledge base
1228 task menu knowledge
1230 task strategy
1232 input
1234 optimizer
1302 control strategy
1304 determine window layouts
1306 select window layouts
1308 output layout to display controller
1341 subroutine call
1342 input operator task status
1344 update menu data
1346 compute window layouts
1348 return
1371 subroutine call
1372 menu master layout
1374 construct layout assignments
1376 micro-model times and workloads
1378 compute cost
1380 all iterations
1384 return

The invention claimed is:

1. A display-interface system which facilitates improved visual task attention of an operator performing tasks with the aid of a display device comprising:
a display device that displays task information to an operator;
an electronic eye tracking sensor configured to continuously monitor the operator's eye-gaze on the display device; and
an electronic processing system that receives signals from the electronic eye tracking sensor and controls the display device comprising:

an electronic task master that determines one or more tasks to be performed by the operator using a display control strategy means implemented by the display device;

an electronic display scheduler that determines operational information and control activations for the display control strategy means for the one or more tasks to be performed; and an adaptive aider that adaptively adjusts one or more display formats for the display control strategy means to be displayed that are configured to present the operational information and control activations thereof on the display device for the one or more tasks to be performed in a manner to improve the state of visual task attention of the operator's interaction with the display device while performing a task, wherein the adaptive aider is configured to:

estimate, at a first point of time, the state of visual task attention of the operator's interaction with the display device monitor based on the monitored operator's eye-gaze on the display device;

specify one or more display formats for the display control strategy means for presenting the operational information and control activations on the display device for the same one or more tasks to be performed for selection based on the estimated state of visual task attention of the operator by:

determining display activation windows from the task time estimated available and the display activation control steps for the one or more tasks, estimating the size of displays activation selection elements required to operate the display by the display control strategy means with the state of visual task attention, determining a set of format design parameters for a combination of menu layouts of the activation fields for the one or more tasks to be performed during the activation windows, selecting format design parameters from the set based on minimizing a cost function expressed in terms of the activation windows and operator workload over the windows, and specifying menu formats and treeing structure from the format design parameters selected for minimal cost wherein, the operator workload is determined from the estimated state of visual workload for when the operator is provided the specified one or more display formats for the display control strategy means; and where the field activation selection elements in the menu display correspond to the operational information and control activations for the display control strategy means for the one or more tasks to be performed;

determine that the state of visual task attention of the operator will be improved from the first point in time to a second point later in time when the operator is provided the specified one or more display formats for the display control strategy means;

select for display, the one or more specified display formats for the display control strategy means based on the determination of the state of visual task attention improvement of the operator, wherein the selected one or more display formats provide a minimal cost in visual task attention workload for the operator for the display control strategy means for the one or more tasks to be performed; and in advance of the one or more tasks being performed by the operator using the display device at the second point in time, displaying the selected one or more display formats for the display control strategy means on the display device for the one or more tasks to be performed.

2. The system of claim 1, wherein the electronic display scheduler is configured to determine a sequence of displaying the one or more determined display formats, operational information and control activations for performance of the one or more tasks based on the estimated state of visual task attention of the operator according to a model of task attention, wherein the model of state of task attention comprises model task and subtask times and workloads as task variables, and the system is configured to deconstruct the tasks to be performed into tasks and subtasks and determine corresponding times.

3. The system of claim 2, wherein the model of task attention, comprises:

a. a table of task variables comprising one or more of task orienting, task recall, task focus, and task execution; and b. a database of corresponding model task and subtask times and workload as cost variables.

4. The system of claim 3, wherein the electronic display scheduler is configured to compute the model task and subtask times and workloads as cost variables for the multiple display formats being considered for the display control strategy means, and to select the one or more displays format with the minimal computed costs.

5. The system of claim 3 wherein task variables of the model of task attention comprise those for attention states of task orienting, task recall, task focus, and task execution, wherein the model task and subtask times are at the millisecond level.

6. The system of claim 5, wherein the electronic display scheduler is configured to schedule a sequence of control activations enabled within a time period, and chose a sequence of display formats for display of operational information for the control activations, where the sequence is chosen to optimize task attention as determined from the model of task attention, where the cost variables are functions of the display format design.

7. The system of claim 6, where the electronic scheduler comprises:

a. a sequencer that, with access to the database, is configured to execute a scheduling process for task combinations according to a control strategy in determining the sequence, and compute associated cost variables; and b. an optimizer that is configured to compute the corresponding cost functions and select the minimal cost schedule to optimize visual task attention for the operator.

8. A method of using the display-interface system of claim 1, the method comprising:

determining by the electronic task master one or more tasks to be performed by the operator using a display control strategy means implemented by the display device;

determining by the electronic display scheduler operational information and control activations for the display control strategy means for the one or more tasks to be performed; and adaptively adjusting by the adaptive aider one or more display formats for the display control strategy means to be displayed that are configured to present the operational information and control activations thereof on the display device for the one or more tasks to be performed in a manner to improve the state of visual task attention of the operator's interaction with the display device while performing a task, by:

estimating, at a first point in time, the state of visual task attention of the operator's interaction with the display device monitor based on the monitored operator's eye-gaze on the display device;

specifying one or more display formats for the display control strategy means for presenting the operational information and control activations on the display device for the same one or more tasks to be performed for selection based on the estimated state of visual task attention of the operator by:

determining display activation windows from the task time estimated available and the display activation control steps for the one or more tasks, estimating the size of displays activation selection elements required to operate the display by the display control strategy means with the state of visual task attention, determining a set of format design parameters for a combination of menu layouts of the activation fields for the one or more tasks to be performed during the activation windows, selecting format design parameters from the set based on minimizing a cost function expressed in terms of the activation windows and operator workload over the windows, and specifying menu formats and treeing structure from the format design parameters selected for minimal cost wherein, the operator workload is determined from the estimated state of visual workload for when the operator is provided the specified one or more display formats for the display control strategy means; and where the field activation selection elements in the menu display correspond to the operational information and control activations for the display control strategy means for the one or more tasks to be performed;

determining that the state of visual task attention of the operator will be improved from the first point in time to a second point later in time when the operator is provided the specified one or more display formats for the display control strategy means;

selecting, for display, the one or more specified display formats for the display control strategy means based on the determination of the state of visual task attention improvement of the operator, wherein the selected one or more display formats provide a minimal cost in visual task attention workload for the operator for the display control strategy means for the one or more tasks to be performed; and in advance of the one or more tasks being performed by the operator using the display device at the second point in time, displaying the selected one or more display formats for the display control strategy means on the display device for the one or more tasks to be performed.

9. The method of claim 8, wherein estimating the state of visual task attention of the operator comprises detecting attributes, wherein the attributes comprise one or more attributes of eye-movements and fixations.

10. The method of claim 8, wherein determining the one or more display formats comprises: determining the size, grouping, arrangement, sequence, selection choices, the number, or any combination thereof, of the operational information and/or control activations which are to be displayed on the display device.

11. The method of claim 8, wherein the operational information and/or control activations comprises: one or more display windows and/or menus displayed on the display device.

12. The method of claim 8, further comprising: determining the time of the display of the one or more display formats on the display device.

13. The method of claim 8, further comprising: ranking the state of visual task attention of the operator to tasks by the degree of cognitive involvement in consecutive control activation functions from task initiation to task completion.

14. The method of claim 8, further comprising:
determining by the electronic display scheduler a schedule for a sequence of displaying the one or more determined display formats, operational information and control activations for the performance of the one or more tasks based on the estimated state of visual task attention of the operator using a model of the state of task attention,
wherein the model of state of task attention comprises model task and subtask times and workloads as task variables, and the method further comprises deconstructing the tasks to be performed into tasks and subtasks and determining corresponding times.

15. The method of claim 14, wherein the task variables of the model of task attention comprise those for attention states of task orienting, task recall, task focus, and task execution, where the model task and subtask times are at the millisecond level.

16. The method of claim 15, wherein determining the schedule comprises scheduling a sequence of control activations enabled within a time period, where the control activations to be enabled are determined from the model of task attention.

17. The method of claim 16, wherein determining the schedule comprises scheduling a sequence of display formats for display of operational information and control activations for the display control strategy means, where the sequence of display formats is chosen to optimize visual task attention as determined from the model of task attention.

18. The method of claim 17, wherein determining the schedule comprises determining a sequence of concurrently occurring multiple tasks and involves switching between shared operations of one task and monitoring of others.

19. The method of claim 17, wherein determining the schedule comprises performing an iterative process that, with access to a database of the model task and subtask times and workloads, computes associated cost variables for task combinations of display formats of operational information and control activations, computes the corresponding cost functions and selects the minimal cost schedule to optimize visual task attention.

20. The method of claim 8, wherein determining that the state of visual task attention of the operator will be improved from the first point in time to the second point in time comprises: determining whether the estimated visual task attention state of the operator exceeds a predetermined threshold indicative of an acceptable state of visual task attention for the operator.

21. The method of claim 20, wherein, if the estimated state of visual task attention of the operator is less than the predetermined threshold, then displaying additional information to the operator of the display for the one or more tasks to be performed.

22. The method of claim 8, further comprising:
computing the model task and subtask times and workloads as cost variables for the one or more specified display formats;
evaluating each of the display formats for cost/benefit for improving the state of visual task attention of the operator's interaction with the display device; and
selecting one or more of the display formats which have a minimal cost.

23. The method of claim 8, wherein the selected one or more display formats comprise one or more display formats configured to improve display-control compatibility between the displayed operational information and the control activations for improving the state of visual task attention of the operator on the one or more tasks on the display device than the unselected display formats, during the scheduled display.

24. The method of claim 8, wherein the display control strategy means comprise eye-pointing activation, touch screen activation, or both.

25. The method of claim 8, wherein there are different display control strategy means available for presenting the operational information and control activations, and the step of selecting the one or more display formats comprises: an automatic decision to change from one display control strategy means to another display control strategy means, and the method further comprises automatically changing to the another display control strategy means.

26. The method of claim 8, wherein there are different format configurations for a given display control strategy means available for presenting the operational information and control activations, and the step of selecting the one or more display formats comprises: an automatic decision to change from one display format configuration to another display format configuration of the same display control strategy means, and the method further comprises automatically changing to the another display control format configuration.

27. The method of claim 8, wherein the specified one or more display formats will present less of the operational information and control activations for the display control strategy means for the one or more tasks to be performed than unselected display formats.

\* \* \* \* \*